(12) United States Patent
Lim et al.

(10) Patent No.: US 9,669,656 B2
(45) Date of Patent: Jun. 6, 2017

(54) BICYCLE FREEWHEEL

(71) Applicant: Shimano (Singapore) Pte. Ltd., Jurong Town (SG)

(72) Inventors: Guang Sheng Elson Lim, Singapore (SG); Puat Thiam Lim, Singapore (SG)

(73) Assignee: Shimano (Singapore) Pte. Ltd., Jurong Town (SG)

( * ) Notice: Subject to any disclaimer, the term of this patent is extended or adjusted under 35 U.S.C. 154(b) by 73 days.

(21) Appl. No.: 13/970,787

(22) Filed: Aug. 20, 2013

(65) Prior Publication Data

US 2015/0053523 A1 Feb. 26, 2015

(51) Int. Cl.
| | |
|---|---|
| *B60B 27/04* | (2006.01) |
| *F16D 41/30* | (2006.01) |
| *F16D 41/064* | (2006.01) |
| *B60B 27/02* | (2006.01) |
| *F16D 41/12* | (2006.01) |

(52) U.S. Cl.
CPC .......... *B60B 27/047* (2013.01); *F16D 41/064* (2013.01); *F16D 41/30* (2013.01); *B60B 27/026* (2013.01); *B60B 2900/133* (2013.01); *F16D 41/12* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,485,217 | A | * | 2/1924 | Crass ............................. 192/46 |
| 2,308,926 | A | * | 1/1943 | Kreis ............................. 192/46 |
| 2,655,052 | A | * | 10/1953 | Montalto ............... F16D 41/12 |
| | | | | 74/126 |
| 3,540,306 | A | * | 11/1970 | Nurmse ......................... 74/576 |
| 6,202,813 | B1 | | 3/2001 | Yahata et al. |
| 7,191,884 | B2 | | 3/2007 | Kanehisa et al. |
| 7,617,920 | B2 | | 11/2009 | Kanehisa |
| 7,938,242 | B2 | | 5/2011 | Chen |
| 8,776,975 | B2 | * | 7/2014 | Chiesa et al. .................. 192/46 |

(Continued)

FOREIGN PATENT DOCUMENTS

| | | |
|---|---|---|
| CN | 1952424 A | 4/2007 |
| JP | 57-90425 | * 6/1982 |

*Primary Examiner* — Mark Manley
(74) *Attorney, Agent, or Firm* — Global IP Counselors, LLP

(57) ABSTRACT

A bicycle freewheel basically includes a driving member, a driven member, at least one first engaging member, at least one second engaging member and at least one contact member. The driving member is to be coupled to a bicycle sprocket. The driven member is to be coupled to a bicycle hub. The driving member and the driven member have oppositely arranged first and second portions, respectively. The at least one first engaging member is disposed on one of the first and second portions, while the at least one second engaging member is disposed on the other of the first and second portions. The at least one second engaging member engages the at least one first engaging member while non-freewheeling. The at least one contact member is disposed on one of the first and second engaging members, and contacts the other of the first and second engaging members while freewheeling.

19 Claims, 17 Drawing Sheets

(56) References Cited

U.S. PATENT DOCUMENTS

2004/0216975 A1* 11/2004 Ruth .................... F16D 41/125
                                                    192/46
2006/0237276 A1* 10/2006 Jegatheeson ........... F16D 41/30
                                                    192/46
2009/0277738 A1* 11/2009 Papania et al. ................. 192/45

* cited by examiner

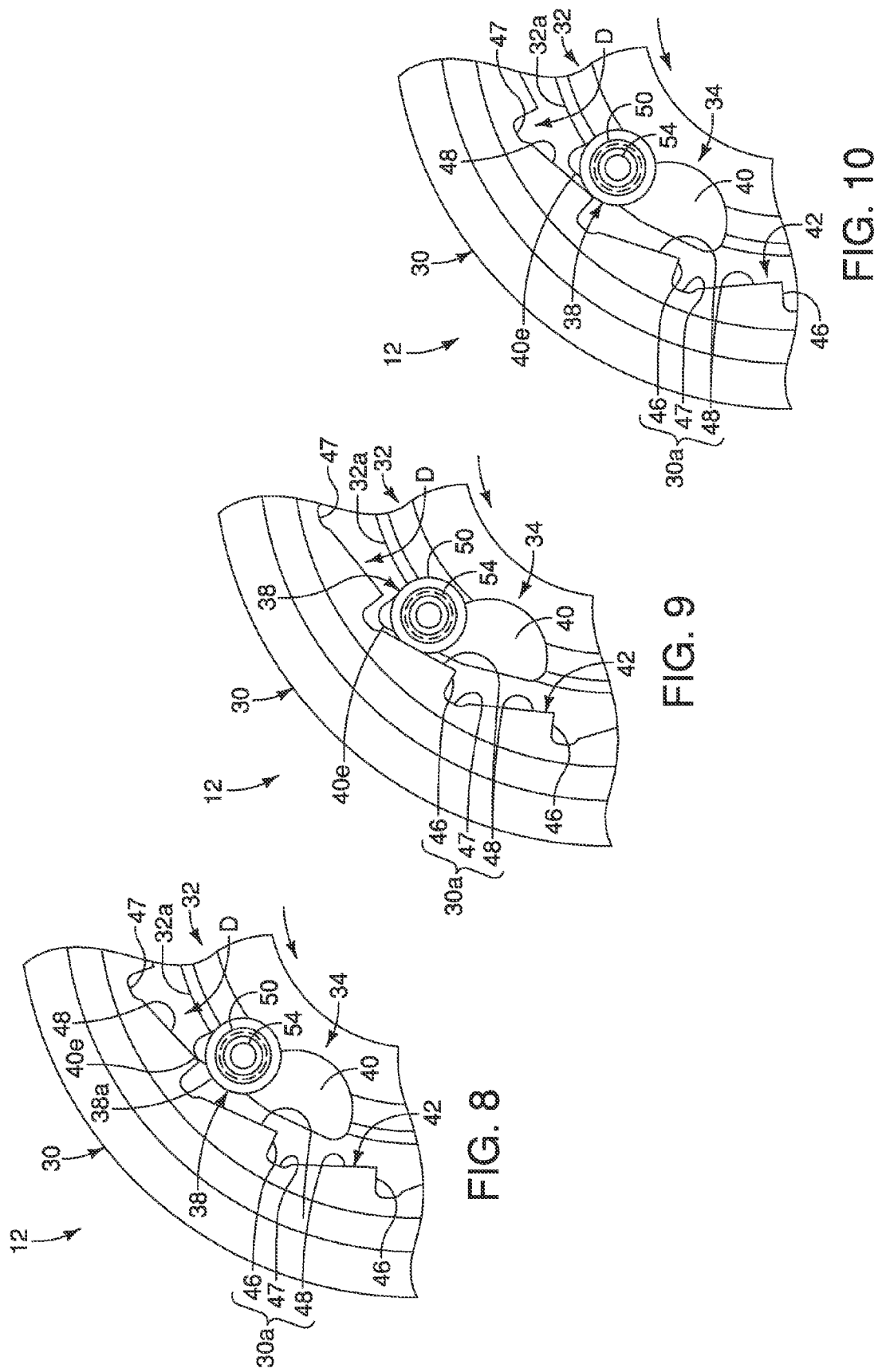

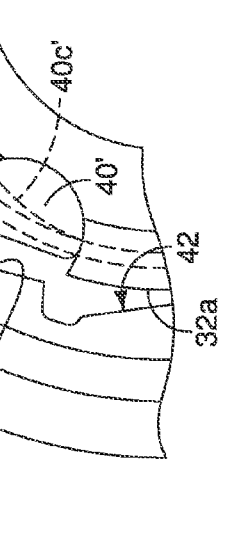
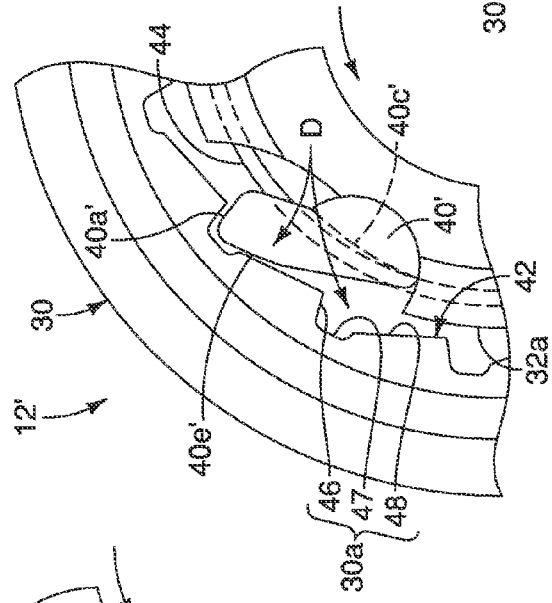
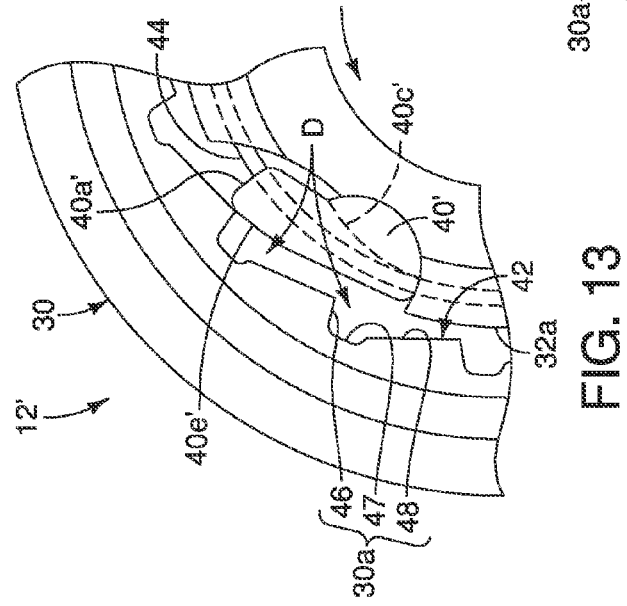
FIG. 13
FIG. 14
FIG. 15

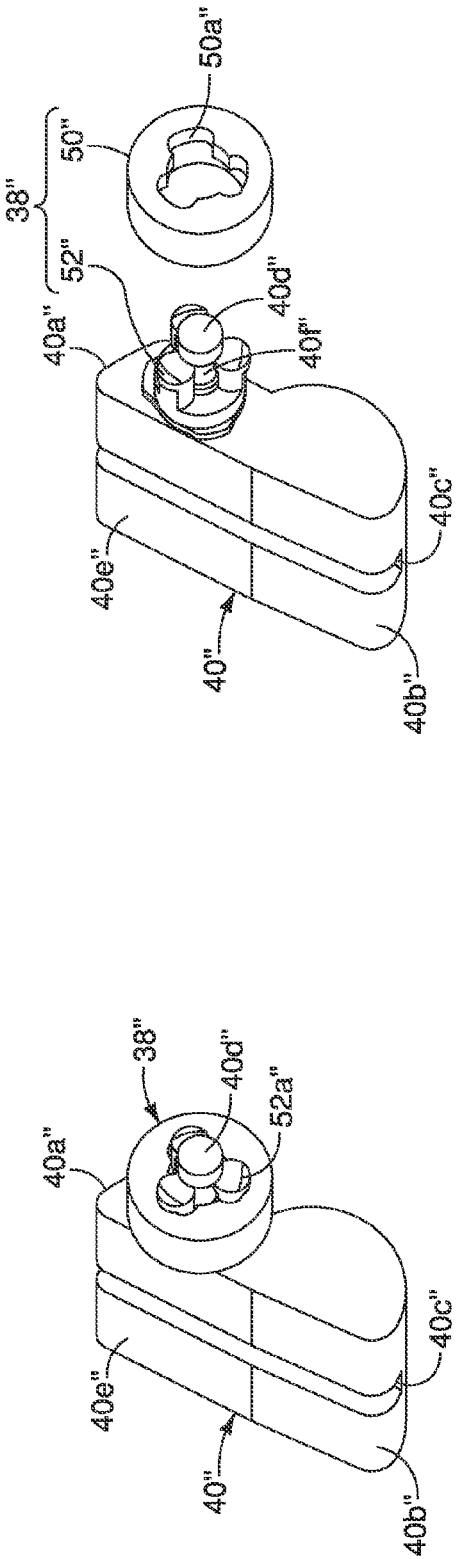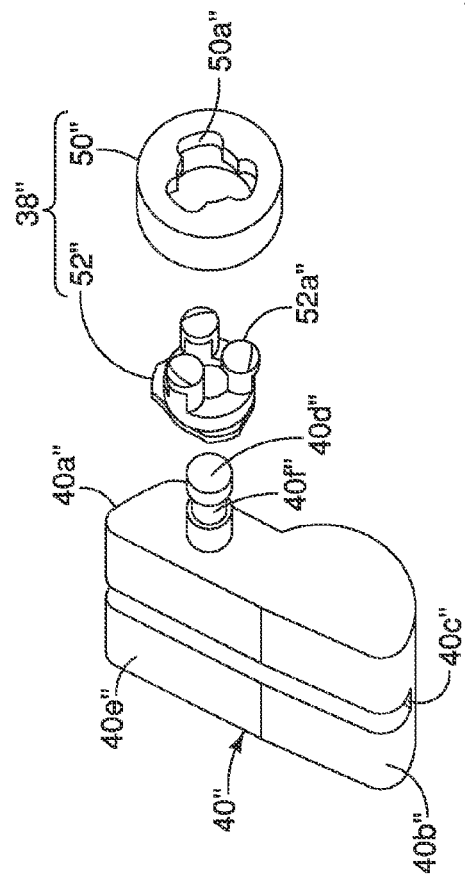

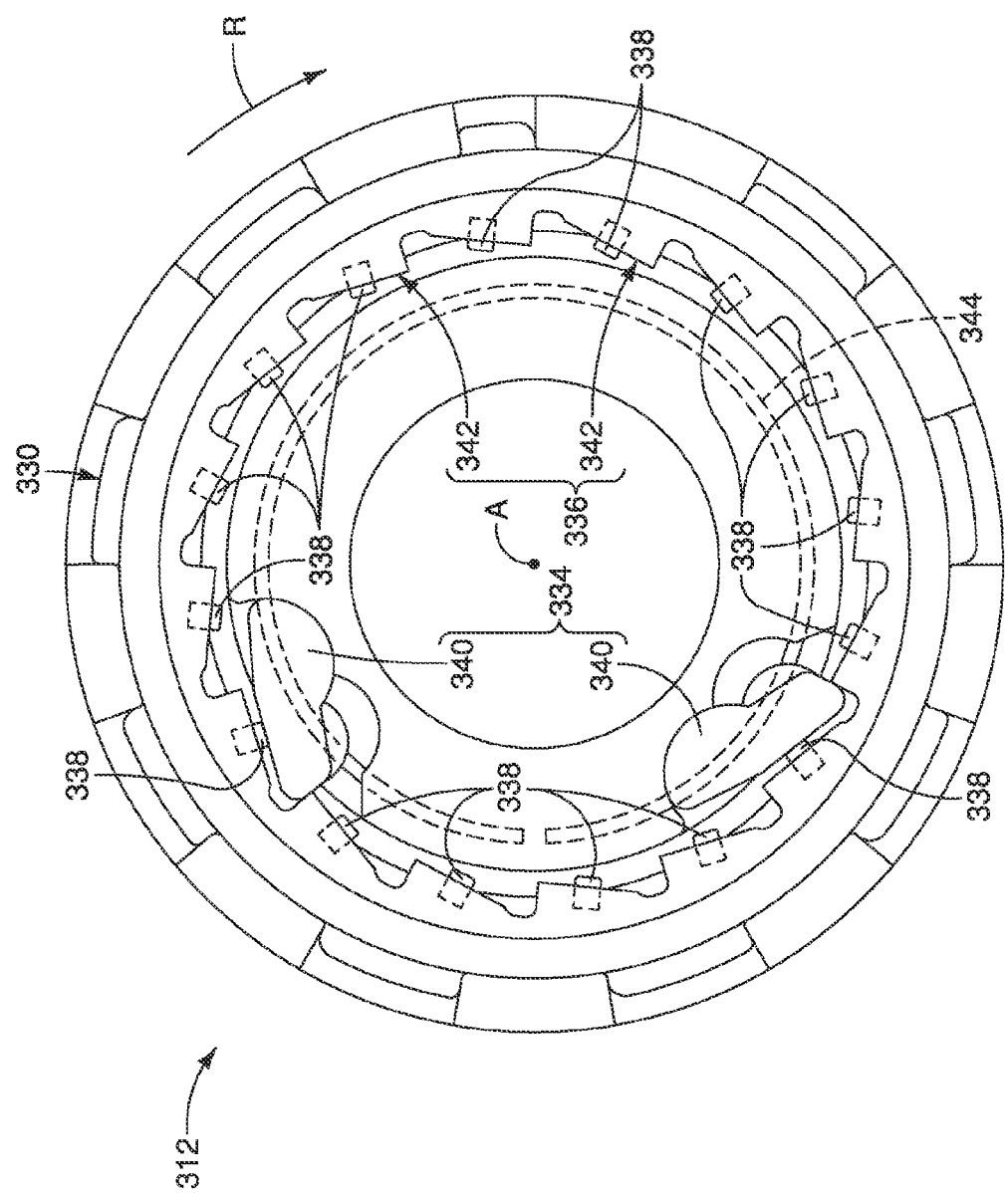

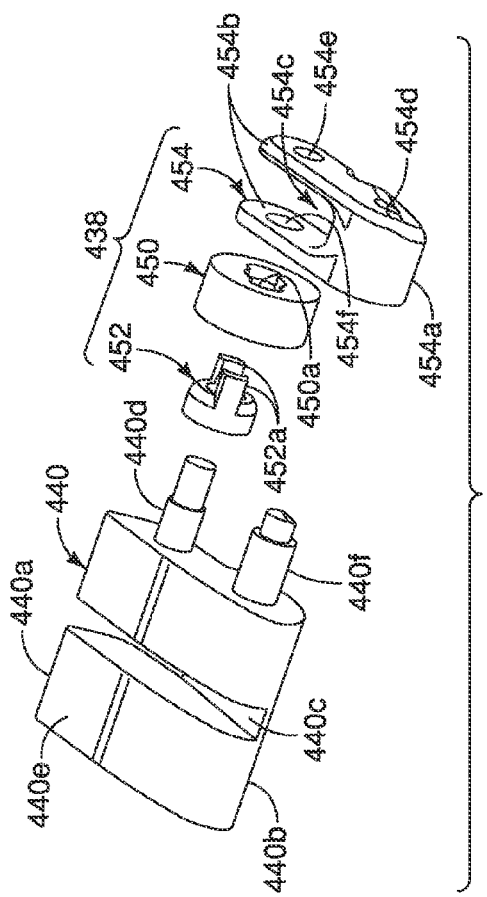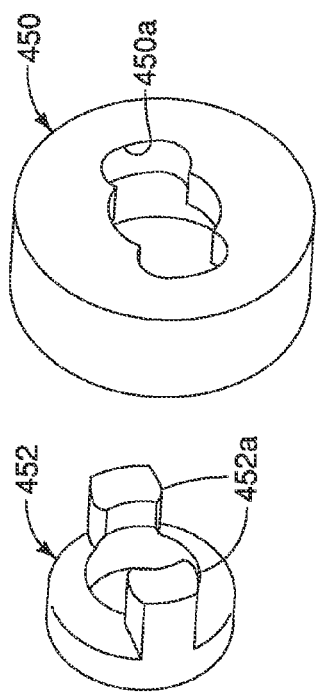

BICYCLE FREEWHEEL

BACKGROUND

Field of the Invention

This invention generally relates to a bicycle freewheel. More specifically, the present invention relates to a bicycle freewheel that is configured to reduce freewheeling noise.

Background Information

In some bicycles with multiple speeds, a wheel of the bicycle, typically the rear wheel, is provided with a bicycle freewheel that is arranged on a hub of the wheel. The bicycle freewheel usually has a one-way clutch function whereby it only transfers torque in one direction. Thus, freewheels are used so that the bicycle can advance freely without any rotation of the pedals (i.e., during coasting). During coasting, the bicycle freewheel is considered to be in a state of freewheeling in which the bicycle wheel can freely rotate while the sprockets remain stationary.

One well-known conventional type of bicycle freewheel is provided with a pawl-type one-way clutch that includes ratchet teeth and clutch pawl configured to mesh with the ratchet teeth. In pawl-type one-way clutches, the clutch pawls are forced (spring loaded) toward engaging positions where they mesh with the ratchet teeth. During freewheeling, the bicycle freewheel often makes a freewheeling noise. Several attempts have been made to produce bicycle freewheels that are configured to reduce the freewheeling noise. Examples such types of bicycle freewheels are disclosed in U.S. Pat. Nos. 6,202,813; 7,617,920; and 7,938,242. In these patents, the bicycle freewheels are configured to prevent a pawl member from contacting with a ratchet-tooth member during freewheeling. However, these freewheels use a structure that retracts the pawl member during freewheeling. Thus, these bicycle freewheels are relatively more complex than conventional bicycle freewheels.

SUMMARY

Generally, the present disclosure is directed to various features of a bicycle freewheel. One aspect is to provide a bicycle freewheel that are configured to reduce the freewheeling noise in a relatively simple manner.

In view of the state of the known technology and in accordance with a first aspect of the present disclosure, a bicycle freewheel is provided that basically comprises a driving member, a driven member, at least one first engaging member, at least one second engaging member and at least one contact member. The driving member is configured to be coupled to a bicycle sprocket. The driving member has a first portion. The driven member is configured to be coupled to a bicycle hub. The driven member has a second portion that is oppositely arranged to the first portion of the driving member. The at least one first engaging member is disposed on one of the first portion of the driving member and the second portion of the driven member. The at least one second engaging member is disposed on the other of the first portion of the driving member and the second portion of the driven member. The at least one second engaging member engages the at least one first engaging member while non-freewheeling. The at least one contact member is disposed on one of the at least one first engaging member and the at least one second engaging member. The at least one contact member contacts the other of the at least one first engaging member and the at least one second engaging member while freewheeling.

In accordance with a second aspect of the present invention, the bicycle freewheel according to the first aspect is configured so that the driving member and the driven member are rotatably arranged about a rotational axis.

In accordance with a third aspect of the present invention, the bicycle freewheel according to the second aspect is configured so that the at least one first engaging member engages the at least one second engaging member while the driving member and the driven member rotate together in a driving rotational direction.

In accordance with a fourth aspect of the present invention, the bicycle freewheel according to the second aspect is configured so that the at least one contact member contacts the other of the at least one first engaging member and the at least one second engaging member before the one of the at least one first engaging member and the at least one second engaging member contacts the other of the at least one first engaging member and the at least one second engaging member as the driving member and the driven member rotate relative to each other in anon-driving rotational direction.

In accordance with a fifth aspect of the present invention, the bicycle freewheel according to the first aspect is configured so that each of the driving member and the driven member has a tubular shape.

In accordance with a sixth aspect of the present invention, the bicycle freewheel according to the fifth aspect is configured so that the first portion is defined by an outer circumferential portion of the driving member, and the second portion is defined by an inner circumferential portion of the driven member. The second portion is arranged around the first portion of the driving member.

In accordance with a seventh aspect of the present invention, the bicycle freewheel according to the fifth aspect is configured so that the second portion is defined by an outer circumferential portion of the driven member, and the first portion is defined by an inner circumferential portion of the driving member arranged around the second portion of the driven member.

In accordance with an eighth aspect of the present invention, the bicycle freewheel according to the first aspect is configured so that the at least one contact member includes a damping member.

In accordance with a ninth aspect of the present invention, the bicycle freewheel according to the eighth aspect is configured so that the damping member is an elastomer member.

In accordance with a tenth aspect of the present invention, the bicycle freewheel according to the first aspect is configured so that the at least one contact member is rotatably mounted on the one of the at least one first engaging member and the at least one second engaging member.

In accordance with an eleventh aspect of the present invention, the bicycle freewheel according to the tenth aspect is configured so that the at least one contact member is a roller member.

In accordance with a twelfth aspect of the present invention, the bicycle freewheel according to the eleventh aspect is configured so that the roller member includes a damping member.

In accordance with a thirteenth aspect of the present invention, the bicycle freewheel according to the twelfth aspect is configured so that the damping member is an elastomer member.

In accordance with a fourteenth aspect of the present invention, the bicycle freewheel according to the first aspect is configured so that the at least one first engaging member includes at least one pawl member, and the at least one second engaging member includes at least one ratchet-tooth member.

In accordance with a fifteenth aspect of the present invention, the bicycle freewheel according to the fourteenth aspect is configured so that the first portion of the driving member includes the at least one pawl member movably mounted thereon, and the second portion of the driven member includes the at least one ratchet-tooth member.

In accordance with a sixteenth aspect of the present invention, the bicycle freewheel according to the fourteenth aspect is configured so that the second portion of the driven member includes the at least one pawl member movably mounted thereon, and the first portion of the driving member includes the at least one ratchet-tooth member.

In accordance with a seventeenth aspect of the present invention, the bicycle freewheel according to the fourteenth aspect is configured so that the at least one pawl member has a distal end and a proximal end. The distal end of the at least one pawl member is configured to engage with the at least one ratchet-tooth member. The proximal end of the at least one pawl member is pivotally mounted on the one of the first portion of the driving member and the second portion of the driven member.

In accordance with an eighteenth aspect of the present invention, the bicycle freewheel according to the fourteenth aspect is configured so that the at least one contact member is disposed on one of the at least one pawl member and the at least one ratchet-tooth member. The at least one pawl member has a freewheeling surface that contacts a freewheeling surface of the at least one ratchet-tooth member during freewheeling. The at least one contact member has a freewheeling surface that contacts the freewheeling surface of the at least one ratchet-tooth member during freewheeling. The freewheeling surface of the contact member is offset from the freewheeling surface of the one of the at least one pawl member and the at least one ratchet-tooth member, which includes the at least one contact member, in a direction toward the freewheeling surface of the other of the at least one pawl member and the at least one ratchet-tooth member.

In accordance with a nineteenth aspect of the present invention, the bicycle freewheel according to the fourteenth aspect is configured so that the at least one pawl member has a distal end and a proximal end, and the contact member is disposed between the distal end and the proximal end in a radial direction.

In accordance with a twentieth aspect of the present invention, a bicycle freewheel is provided that basically basically comprises a driving member, a driven member, at least one pawl member and at least one ratchet-tooth member. The driving member is configured to be coupled to a bicycle sprocket. The driving number has a first portion. The driven member is configured to be coupled to a bicycle hub. The driven member has a second portion that is oppositely arranged to the first portion of the driving member. The at least one pawl member is disposed on one of the first portion of the driving member and the second portion of the driven member. The at least one ratchet-tooth member is disposed on the other of the first portion of the driving member and the second portion of the driven member. The at least one ratchet-tooth member engages the at least one pawl member while non-freewheeling. The at least one ratchet-tooth member includes a first depression and a second depression formed in the first depression.

In accordance with a twenty-first aspect of the present invention, the bicycle freewheel according to the twentieth aspect is configured so that the second depression is configured relative to the first depression to prevent a tip of the at least one pawl member from initially contacting the at least one ratchet-tooth member immediately upon the at least one pawl member moving into the first depression of the at least one ratchet-tooth member while freewheeling.

In accordance with a twenty-second aspect of the present invention, the bicycle freewheel according to the twentieth aspect is configured so that at least one contact member disposed on the at least one pawl member, and the at least one contact member being configured to contact the at least one ratchet-tooth member.

In accordance with a twenty-third aspect of the present invention, the bicycle freewheel according to the twenty-second aspect is configured so that the at least one contact member is made of an elastic material.

Other objects, features, aspects and advantages of the disclosed bicycle freewheel will become apparent to those skilled in the on from the following detailed description, which, taken in conjunction with the annexed drawings, discloses preferred embodiments of the bicycle freewheel.

BRIEF DESCRIPTION OF THE DRAWINGS

Referring now to the attached drawings which form a part of this original disclosure:

FIG. 8 is a partial elevational view of the bicycle freewheel as viewed from the opposite side (the inner axial end) of the bicycle freewheel from the side (the outer axial end) of the bicycle freewheel that is illustrated in FIG. 4 with the pawl member of the pawl-type one-way clutch being in a position in which the pawl member contacts the ratchet teeth by the contact members while freewheeling;

FIG. 9 is a partial elevational view of the bicycle freewheel illustrated in FIG. 8, with the clutch pawl of the pawl-type one-way clutch being in a position in which the pawl member is held out of contact from the ratchet teeth by the contact members while freewheeling;

FIG. 10 is a partial elevational view of the bicycle freewheel illustrated in FIGS. 8 and 9, with the pawl member of the pawl-type one-way clutch being in another position in which the freewheeling surface of the pawl member is held out of contact from the ratchet teeth by the contact members while freewheeling;

FIG. 13 is an enlarged partial devotional view, similar to FIG. 8, of an alternate bicycle freewheel in which pawl members without contact members are used in the pawl-type one-way clutch;

FIG. 14 is an enlarged partial elevational view, similar to FIG. 9, of the alternate bicycle freewheel of FIG. 13;

FIG. 15 is an enlarged partial elevational view, similar to FIG. 10, of the alternate bicycle freewheel of FIG. 13;

FIG. 16 is a perspective view of a pawl member with an alternate contact member and an alternate mounting arrangement;

FIG. 17 is a partially exploded perspective view of the pawl member illustrated in FIG. 16 with the alternate contact member and the alternate mounting arrangement;

FIG. 18 is a further exploded perspective view of the pawl member illustrated in FIGS. 16 and 17 with the alternate contact member and the alternate mounting arrangement;

FIG. 23 is an axial elevational view, similar to FIG. 4, of another alternate bicycle freewheel as seen from the outer end with selected parts removed for the purposes of illustration to shown a pawl-type one-way clutch in which a driving member includes a plurality of ratchet-tooth members that each include a contact member;

FIG. 24 is a perspective view of a pawl member with an alternate contact member and an alternate mounting arrangement;

FIG. 25 is an exploded perspective view of the pawl member illustrated in FIG. 24 with the alternate contact member and the alternate mounting arrangement;

FIG. 26 is an exploded perspective view of the alternate contact member illustrated in FIGS. 24 and 25;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
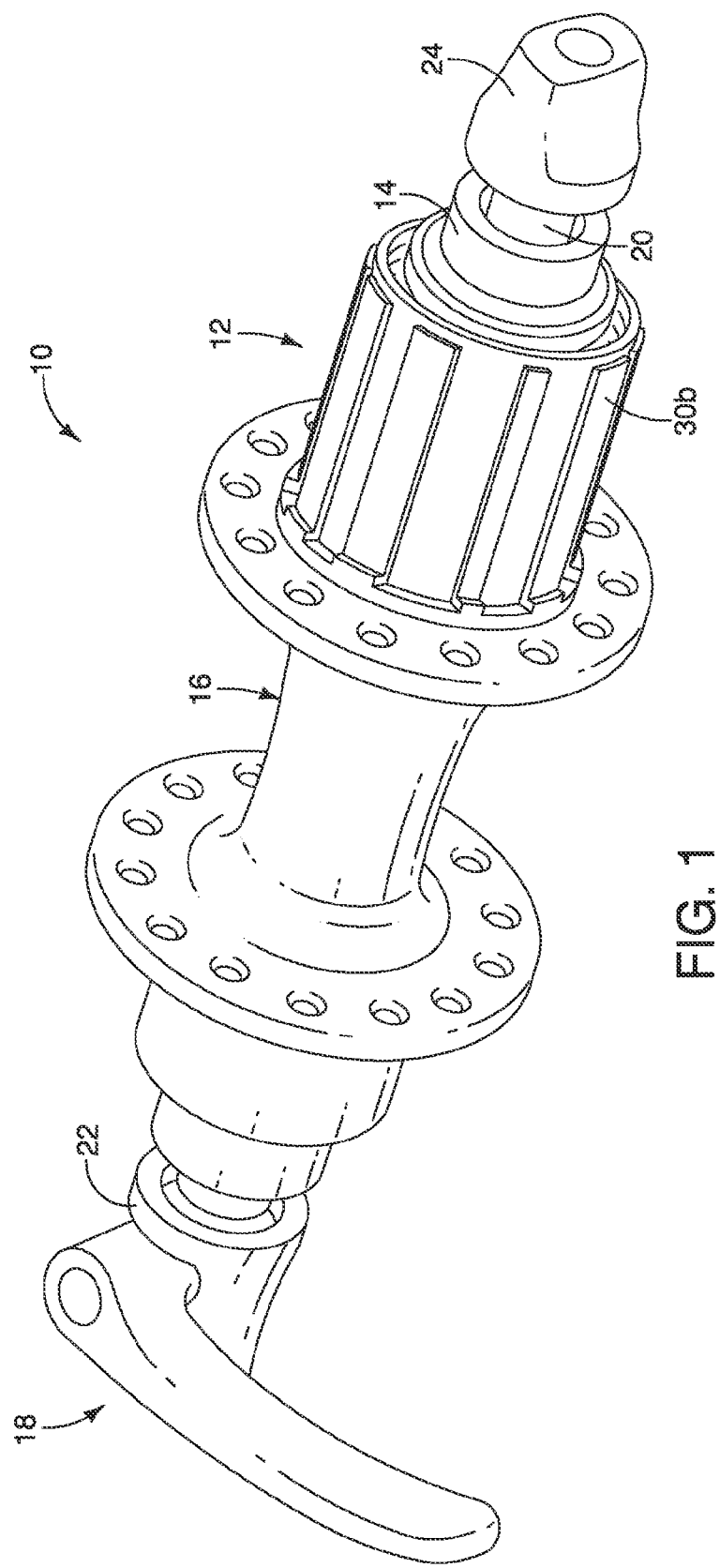
FIG. 1 is a perspective view of a rear bicycle hub that is equipped a bicycle freewheel in accordance with a first embodiment.
Figure 2:
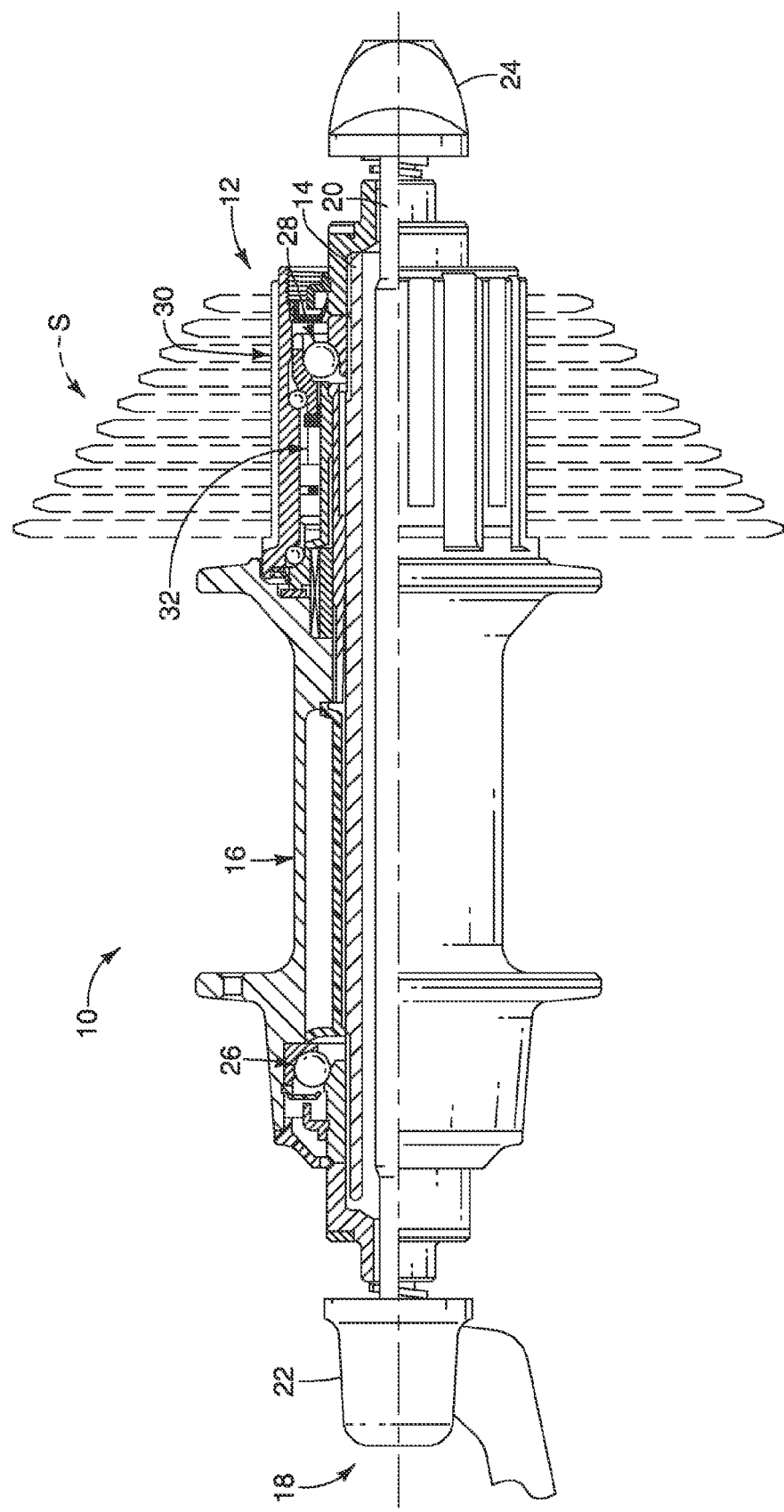
FIG. 2 is a half cross sectional view of the rear bicycle hub illustrated in FIG. 1.

Referring initially to FIGS. 1 and 2, a rear bicycle hub 10 is illustrated that is equipped with a bicycle freewheel 12 in accordance with a first embodiment. As shown in FIG. 1, the bicycle hub 10 basically includes a hub axle 14 and a hub body 16. A frame securing device 18 is provided for attaching the bicycle hub 10 to a bicycle frame (not shown) in a conventional manner. In the first illustrated embodiment, the frame securing device 18 includes a skewer or spindle 20 that has a cam lever mechanism 22 mounted at one end of the spindle 20 and an end cap 24 threaded onto the other end of the spindle 20. Thus, the bicycle hub 10 can be mounted onto a rear section of a bicycle frame of a bicycle. The hub body 16 is rotatably mounted on the hub axle 14 in a conventional manner via a pair of bearing units 26 and 28. In the first illustrated embodiment, the bearing unit 28 also rotatably supports the bicycle freewheel 12 relative to the hub axle 14. As seen in FIG. 2, the bicycle freewheel 12 is configured to receive a plurality of sprockets S.

Figure 3:
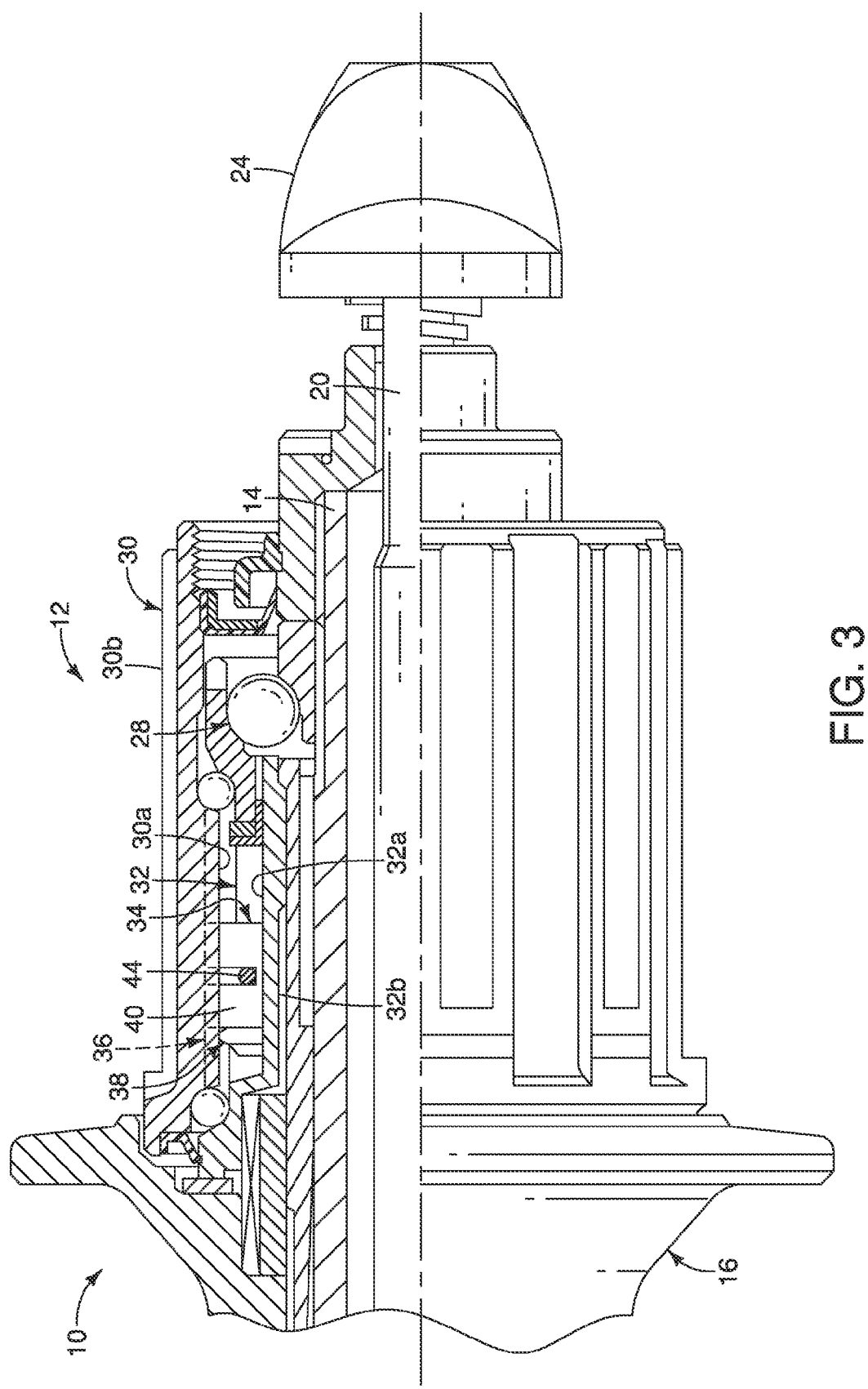
FIG. 3 is an enlarged half cross sectional view of the end of the rear bicycle hub having the bicycle freewheel.
Figure 4:
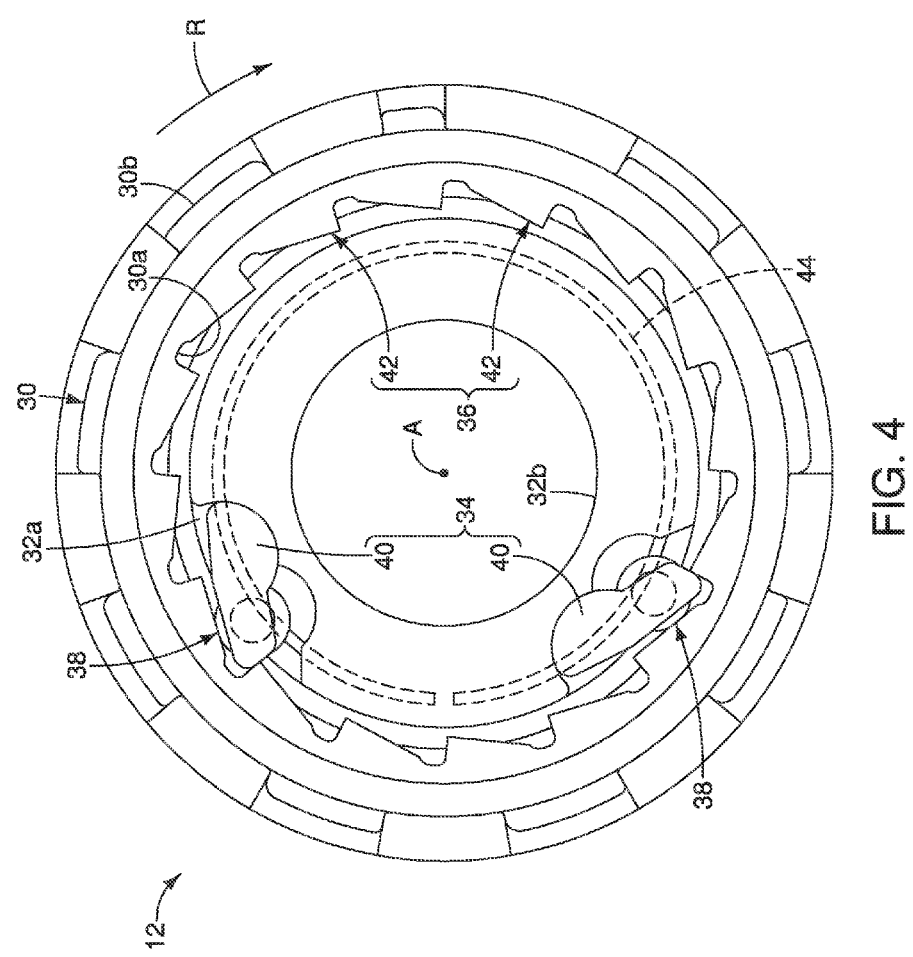
FIG. 4 is an axial elevational view of the bicycle freewheel as seen from the outer end with selected parts removed for the purposes of illustration to shown a pawl-type one-way clutch that includes a plurality of ratchet teeth and a pair of pawl members having rollers as contact members for providing a quieter freewheel.
Figure 5:
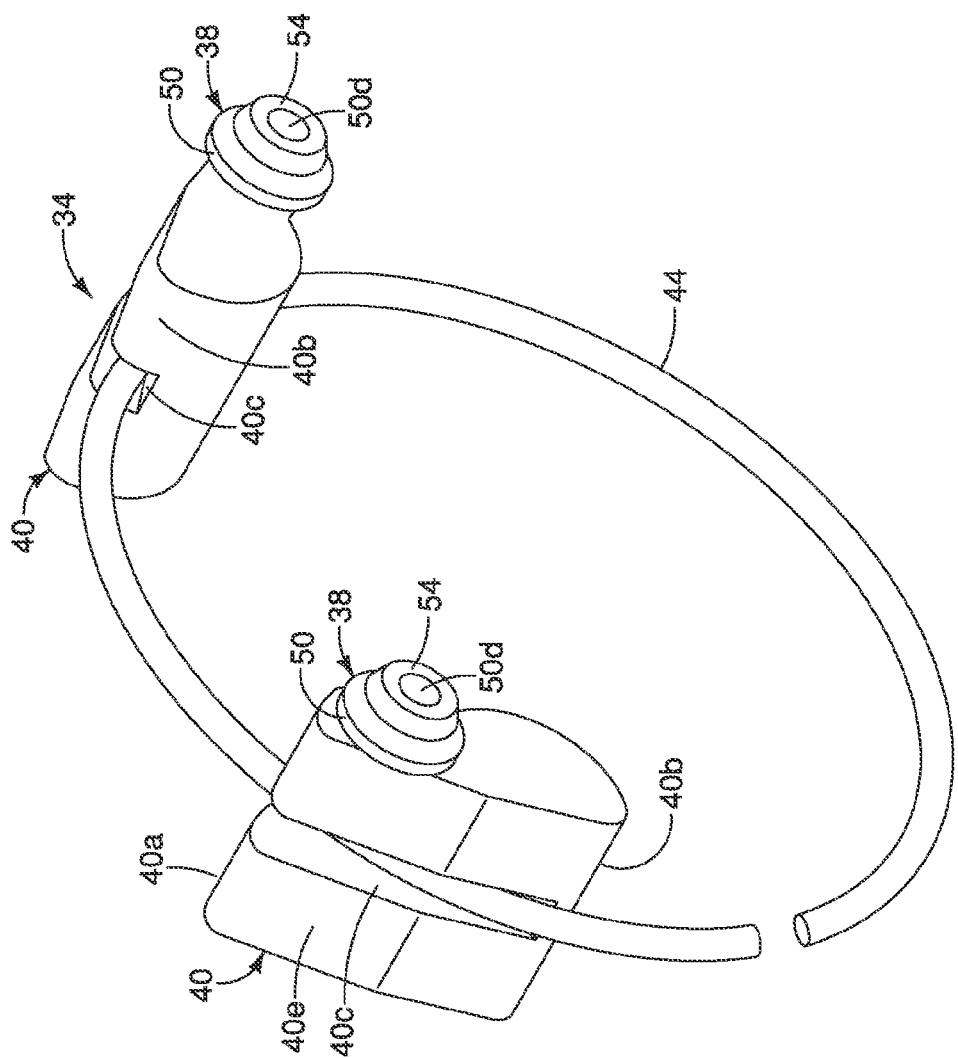
FIG. 5 is a perspective view of the pawl members with contact members and the biasing member of the pawl-type one-way clutch.

Referring now to FIGS. 3 to 5, the bicycle freewheel 12 will be discussed in more detail. The bicycle freewheel 12 basically includes a driving member 30, a driven member 32, at least one first engaging member 34, at least one second engaging member 36 and at least one contact member 38. The driving member 30 is configured to be coupled to the bicycle sprockets S. The at least one second engaging member 36 engages the at least one first engaging member 34 while non-freewheeling such that rotation of the driving member 30 rotates the driven member 32 via two bearing units (not numbered) as seen in FIG. 3. As explained below, the at least one contact number 38 is disposed on one of the at least one first engaging member 34 and the at least one second engaging member 36. The at least one contact member 38 contacts the other of the at least one first engaging member 34 and the at least one second engaging member 36 while freewheeling. Freewheeling occurs when the driving member 30 moves in a non-driving rotational direction relative to the driven member 32 as explained below. In particular, during freewheeling, the at least one contact member 38 contacts the other of the at least one first engaging member 34 and the at least one second engaging member 36 before the one of the at least one first engaging member 34 and the at least one second engaging member 36 contacts the other of the at least one first engaging member 34 and the at least one second engaging member 36 as the driving member 30 and the driven member 32 rotate relative to each other in a non-driving rotational direction.

The driving member 30 has a first portion, while the driven member 32 has a second portion that is oppositely arranged to the first portion of the driving member 30. In the first illustrated embodiment, the first portion is defined by an inner circumferential portion 30a of the driving member 30, and the second portion is defined by an outer circumferential portion 32a of the driven member 32. The first portion (i.e., inner circumferential portion 30a) of the driving member 30 is arranged around the second portion (i.e., the outer circumferential portion 32a) of the driven member 32. The at least one first engaging member 34 is disposed on one of the first portion of the driving member 30 and the second portion of the driven member 32, while the at least one second engaging member 36 is disposed on the other of the first portion of the driving member 30 and the second portion of the driven member 32.

Still referring to FIGS. 3 and 4, the driving member 30 has an outer circumferential portion 30b with a plurality of splines for non-rotatably engaging the bicycle sprockets S in a conventional manner. The bicycle sprockets S are held on the driving member 30 by a conventional nut (not shown) that screws into the driving member 30. The driven member 32 has an inner circumferential portion 32h that is configured to be non-rotatably attached to the hub body 16 in a conventional manner. Since the bicycle freewheel 12 is relatively conventional, except for the at least one contact member 38 is disposed on one of the at least one first engaging member 34 and the at least one second engaging member 36, the driving member 30 and the driven member 32 will not be discussed and/or illustrated in detail.

In the first illustrated embodiment, the outer circumferential portion 32a (i.e., the second portion) of the driven member 32 includes the at least first engaging member 34, and the inner circumferential portion 30a (i.e., the first portion) of the driving member 30 includes the at least second engaging member 36. Preferably, the at least one contact member 38 is rotatably mounted on the one of the at least one first engaging member 34 and the at least one second engaging member 36. In the first illustrated embodiment, each of the first engaging member 34 includes the at least one contact member 38.

Each of the driving member 30 and the driven member 32 has a tubular shape. In the first illustrated embodiment, as seen in FIG. 4, the driving member 30 is concentrically disposed around the driven member 32. In the first illustrated embodiment, the at least one first engaging member 34 includes at least one pawl member 40, and more preferably at least two pawl members 40 as seen in FIGS. 4 and 5. In the first illustrated embodiment, the at least one second engaging member 36 includes at least one ratchet-tooth member 42, and more preferably a plurality of ratchet-tooth members 42. In the first illustrated embodiment, the outer circumferential portion 32a (i.e., the second portion) of the driven member 32 includes the at least one pawl member 40 being movably mounted thereon, and the inner circumferential portion 30a (i.e., the first portion) of the driving member 30 includes the at least one ratchet-tooth member 42. In the first embodiment, the ratchet-tooth members 42 are disposed on the inner circumferential portion 30a (i.e., the first portion) of the driven member 32 and the pawl members 40 are disposed on the outer circumferential portion 32a (i.e., the second portion) of the driving member 30. However, at least one the pawl member can be disposed on one of the first portion of the driving member and the second portion of the driven member, and the at least one ratchet-tooth member disposed on the other of the first portion of the driving member and the second portion of the driven member. In any case, the at least one ratchet-tooth member engages the at least one pawl member while non-freewheeling.

The bicycle freewheel 12 further includes a force applying (biasing) number 44 that biases the pawl members 40 towards engagement with the ratchet-tooth members 42. In the illustrated embodiment, as seen in FIGS. 4 and 5, the force applying member 44 is a split ring shaped that holds the pawl members 40 on the driven member 32 and applies a biasing force on each of the pawl members 40 to pivot the pawl members 40 towards engagement with the ratchet-tooth members 42. Thus, the pawl members 40 and the ratchet-tooth members 42 form a pawl-type one-way clutch. The one-way clutch serves to transfer only forward rotation of the driving member 30 to the driven member 32. The driving member 30 is selectively connected to the driven member 32 by the one-way clutch (e.g., the pawl members 40 and the ratchet-tooth members 42) to the hub body 16 of the bicycle hub 10 to rotate the hub body 16 in the driving rotational direction R as the driving member 30 rotates in the driving rotational direction R.

Thus, the pawl members 40 constitute clutch pawls and the ratchet-tooth members 42 constitute ratchet teeth that are engaged with the pawl members 40 so that the driving member 30 and the driven member 32 rotate together in a driving rotational direction R. In other words, the at least one first engaging member 34 (e.g., the pawl members 40) engages the at least one second engaging member 36 (e.g., the ratchet-tooth members 42) while the driving member 30 and the driven member 32 rotate together in the driving rotational direction R. The driving member 30 and the driven member 32 are rotatably arranged about a rotational axis A that corresponds to the center longitudinal axis of the hub axle 14. The driven member 32 is configured to be fixedly coupled to the hub body 16 of the bicycle hub 10 such that the hub body 16 rotates with the driven member 32. Thus, the one-way clutch is provided for the purpose of transferring rotation from the driving member 30 to the hub body 16 via the driven member 32 only when the driving member 30 rotates in the forward or driving rotational direction R (i.e., the clockwise direction in FIG. 4). On the other hand, if the hub body 16 and the driven member 32 rotate in the clockwise direction (i.e., the clockwise direction from the perspective of FIG. 4) relative to the driving member 30, the rotation of the driven member 32 will not be transferred to the driving member 30.

However, if the driving member 30 is held stationary by a chain that is engaged with one of the sprocket S, then the driven member 32 can freely rotate in the driving rotational direction R while the driving member 30 remains stationary. This relative movement between the driving member 30 and the driven member 32 is known as freewheeling. Thus, during freewheeling, the driving member 30 moves in a non-driving rotational direction relative to the driven member 32.

Figure 6:
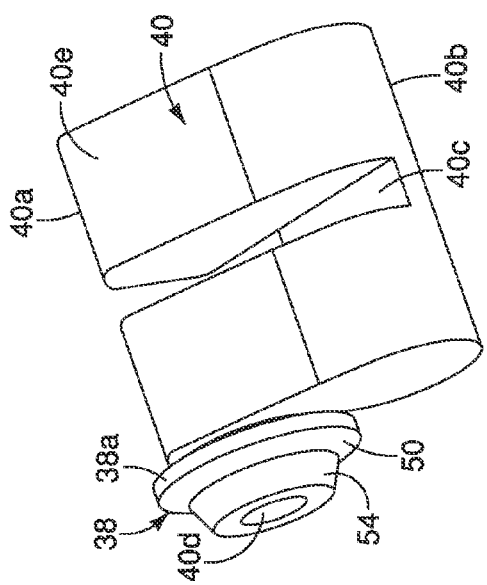
FIG. 6 is a perspective view of one of the pawl members and the contact members of the pawl-type one-way clutch.
Figure 7:
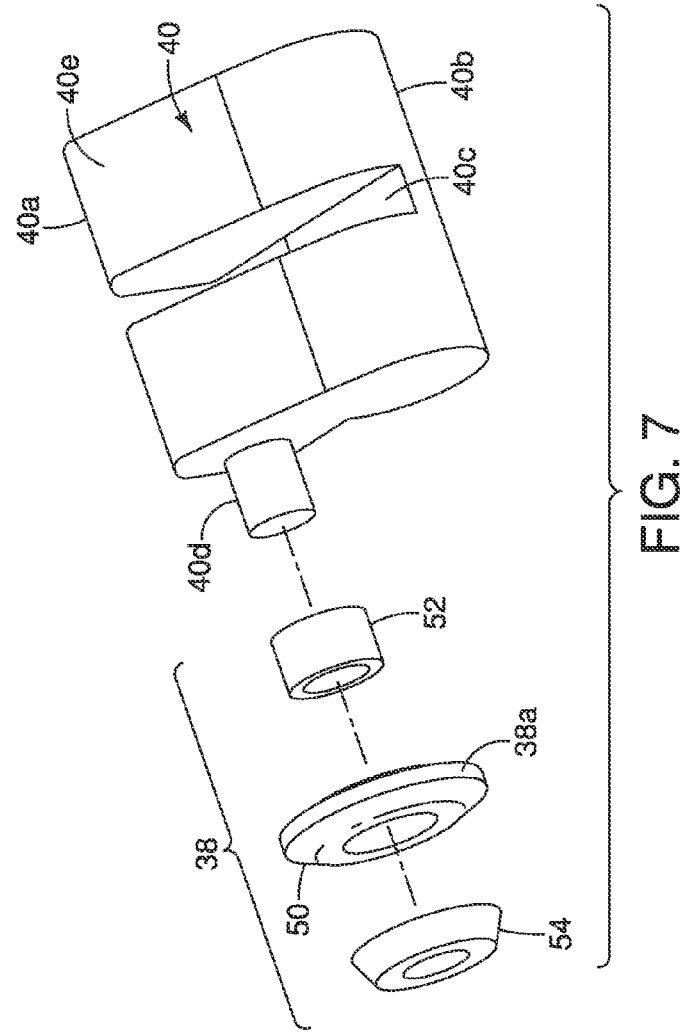
FIG. 7 is an exploded perspective view of the pawl member and the contact members of the pawl-type one-way clutch illustrated in FIG. 6.
Figure 11:
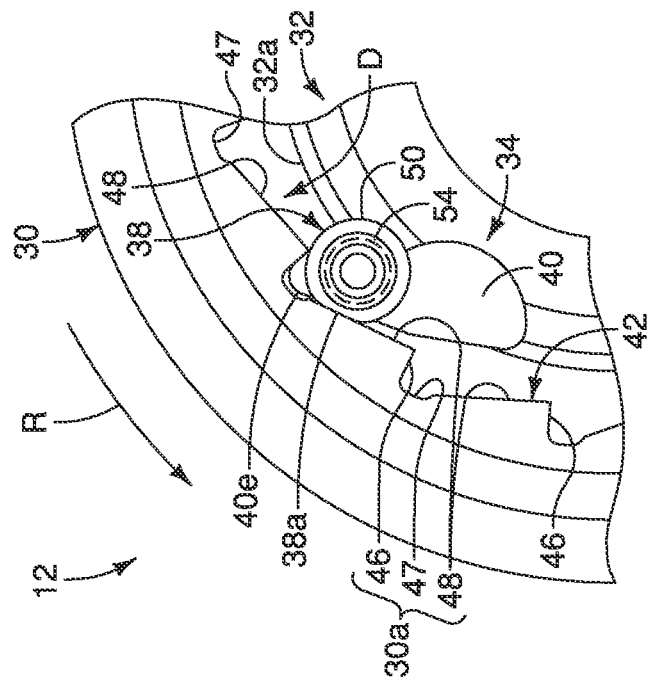
FIG. 11 is a partial elevational view of the bicycle freewheel illustrated in FIGS. 8 to 10, but with the driving member being started to rotate in a driving rotational direction such that the ratchet teeth begins to contact the pawl member to rotate the driven member.

Referring to FIGS. 5 and 6, each of the pawl members 40 has a distal end 40a and a proximal end 40b. Each of the pawl members 40 further has a groove 40c that extends from the distal end 40a to the proximal end 40b for receiving the force applying member 44, and a contact member mounting portion 40d formed on the distal end 40a. The distal ends 40a of the pawl members 40 are configured to engage with the ratchet-tooth members 42. The pawl members 40 are pivotally mounted on the one of the first portion of the driving member 30 and the second portion of the driven member 32 at the proximal ends 40b of the pawl members 40. The contact member 38 is disposed between the distal end 40a and the proximal end 40b in a radial direction. In the first illustrated embodiment, the proximal ends 40b of the pawl members 40 are pivotally mounted on the outer circumferential portion 32a (i.e., the second portion) of the driven member 32 by the force applying member 44. The force applying member 44 spring loads the pawl members 40 to pivot the distal end 40a radially outward towards engagement with the inner circumferential portion 30a of the driving member 30. The force applying member 44 constitutes a pawl spring. This type of pawl spring is well known in the bicycle field with respect to freewheels.

As seen in FIGS. 8 to 12, the inner circumferential portion 30a of the driving member 30 that defines the ratchet-tooth members 42 includes a plurality of driving surfaces 46, a plurality of depressions 47 and a plurality of freewheeling surfaces 48. The driving surfaces 46, the depressions 47 and the freewheeling surfaces 48 are arranged in alternating series to define a plurality of first depressions D for receiving the distal ends 40a of the pawl members 40 as seen in FIGS. 8 to 12. The depressions 47 are located immediately adjacent to the driving surfaces 46. Each of the depressions 47 constitutes a second depression that is formed in a respective one of the first depressions D. Preferably, each of the depressions 47 constitutes a second depression that is formed in a respective one of the first depressions D. The contact members 38 and the second depressions 47 prevent the distal ends 40a of the pawl members 40 from contacting the ratchet-tooth members 42 during freewheeling. In this regard, the second depressions 47 can be omitted from the first embodiment. However, the bicycle freewheel 12 having both of the contact members 38 and the second depression member is more preferably than a bicycle freewheel having only the contact members to reduce noise.

Figure 12:
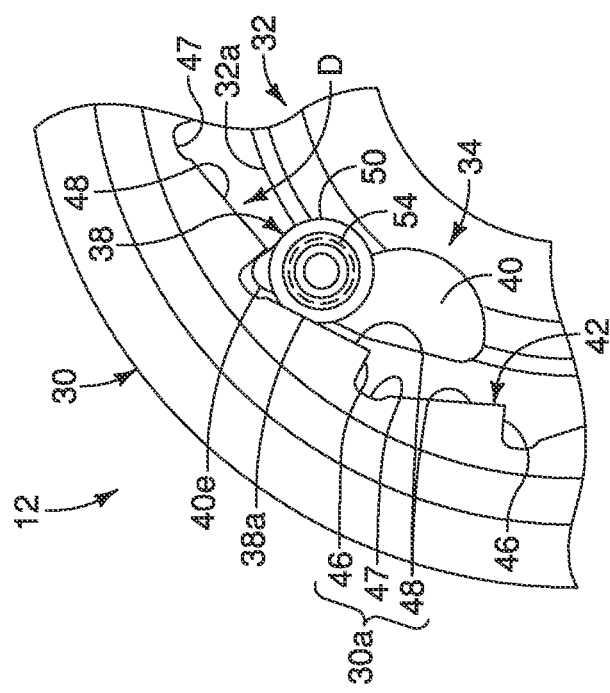
FIG. 12 is a partial elevational view of the bicycle freewheel illustrated in FIG. 11, but with the driving member being rotated further in the driving rotational direction from the position illustrated in FIG. 11 such that the contact member compresses to increase the contact of the pawl member with one of the ratchet teeth of the driving member.

Each of the pawl members 40 has a freewheeling surface 40e that contacts a freewheeling surface 48 of each of the ratchet-tooth members 42 during freewheeling as seen in FIG. 8. Also, each of the contact members 38 has a freewheeling surface 38a that contacts the freewheeling surfaces 48 of the ratchet-tooth members 42 during freewheeling as seen in FIGS. 9 to 10. Thus, the freewheeling surfaces 40e of the pawl members 40 only contact the freewheeling surfaces 48 of the ratchet-tooth members 42 for part of the time during freewheeling. The pawl members 40 are spring loaded by the force applying member 44 so that the distal ends 40a of the pawl members 40 project radially outward. In this way, as the driving member 30 rotates in the driving rotational direction R, each of the pawl members 40 simultaneously engages two of the driving surfaces 46 of the ratchet-tooth members 42 as seen in FIG. 12. Preferably, the freewheeling surfaces 38a of the contact members 38 are offset from the freewheeling surfaces 40e of the pawl members 40 in a direction toward the freewheeling surfaces 48 of the ratchet-tooth members 42. In this way, during freewheeling, the freewheeling surfaces 38a of the contact members 38 first contacts the freewheeling surfaces 48 of the ratchet-tooth members 42 as the pawl members 40 move into contact from one of the ratchet-tooth members 42 to the next ratchet-tooth members 42 as seen in FIGS. 8 to 10.

As seen in FIG. 9, during freewheeling, the contact members 38 are slightly compressed by the biasing force of the force applying member 44. However, the distal ends 40a of the pawl members 40 do not contact the inner circumferential portion 30a of the driving member 30 while the freewheeling surfaces 38a of the contact members 38 are in contact with the inner circumferential portion 30a of the driving member 30.

Preferably, as seen in FIGS. 5 and 6, the at least one contact member is rotatably mounted on the one of the at least one first engaging member 34 (e.g., the pawl members 40) and the at least one second engaging member 36 (e.g., the ratchet-tooth members 42). In other words, the at least one contact member 38 is disposed on one of the pawl members 40 and the ratchet-tooth members 42. In the first illustrated embodiment, each of the pawl members 40 includes the at least one contact member 38. Also in the first illustrated embodiment, the at least one contact member 38 is a roller member that includes a damping member 50 and a bearing sleeve 52. The damping member 50 and the bearing sleeve 52 are rotatably mounted on one of the contact member mounting portion 40d using a push locking ring 54. Since the contact members 38 are rollers in this first embodiment, the contact members 38 rotate relative to the pawl members 40 as the contact members 38 roll along the freewheeling surfaces 48 of the ratchet-tooth members 42. In this way, as the pawl members 40 move from one of the first depressions D to the next during freewheeling, the contact members 38 gradually moves the pawl members 40 into contact with the freewheeling surfaces 48 of the ratchet-tooth members 42.

The damping member 50 is preferably an elastomer member that defines the freewheeling surface 38a of the contact member 38. In other words, the damping members 50 are resilient members that compress slightly upon impacting the freewheeling surfaces 48 of the ratchet-tooth members 42 during freewheeling and that expand back to their original undeformed state as the pawl members 40 move from one of the first depressions D to the next during freewheeling. It will be apparent from this disclosure that the at least one contact member 38 can simply be a non-rotatable member that is made of a material suitable for reducing noise, as compared to the metal of the pawl members 40. In other words, the at least one contact member 38 can be either an elastomer member or a non-elastomer member that is either rotatably mounted or non-rotatably mounted.

The operation of the freewheel 14 will now be described. When a rider pedals a bicycle, a chain will rotates the sprockets S in the driving rotational direction R. This rotation of sprockets S will rotate the driving member 30 in the driving rotational direction R. As the driving member 30 rotates in the driving rotational direction R, the driving surfaces 46 of two of the ratchet-tooth members 42 will engage the distal ends 40a of the pawl members 40. The distal ends 40a of the pawl members 40 will mesh with the two of the ratchet-tooth members 42 so as to compress the damping member 50 and provide a strong engagement between the driving member 30 and the driven member 32. The rotation of the driving member 30 is transferred to the driven member 32, thereby causing the wheel of the bicycle to rotate. Meanwhile, if the rider stops pedaling, the driven member 32 will rotate relative to the driving member 30 in the direction depicted as the clockwise direction in FIG. 4 because the hub body 16 is rotating. However, clockwise rotation of the driven member 32 is not transferred to the driving member 30 because the ratchet-tooth members 42 acts to move the pawl members 40 relative to the ratchet-tooth members 42 in such a direction that the ratchet-tooth members 42 push the pawl members 40 radially inward toward the disengaged position. Now the freewheeling surfaces 38a of the contact members 38 contact the freewheeling surfaces 48 of the ratchet-tooth members 42 prior to the freewheeling surfaces 40e of the pawl members 40 contacting the freewheeling surfaces 48 of the ratchet-tooth members 42, and thereby the freewheeling noise is reduced. Because the freewheeling surfaces 38a of the contact members 38 contact the freewheeling surfaces 48 of the ratchet-tooth members 42 prior to the freewheeling surfaces 40e of the pawl members 40 contacting the freewheeling surfaces 48 of the ratchet-tooth members 42, the pivoting distances of the pawl members 40 until the pawl members 40 contacts with the freewheeling surfaces 48 of the ratchet-tooth members 42 after the freewheeling surfaces 38a of the contact members 38 contact with the freewheeling surfaces 48 of the ratchet-tooth members 42 is smaller than the total pivoting distances of the pawl members 40 in the case of having no contact members. In this way, impact when the pawl members 40 contacts with the freewheeling surface 48 of the ratchet-tooth members 42 is reduced. Therefore, it is possible to reduce freewheeling noise without a pawl-retracting structure disclosed e.g. in the above-mentioned prior arts so that simplified structure can be obtained.

Referring now to FIGS. 13 to 15, a bicycle freewheel 12' in accordance with a first modification of the first embodiment will now be explained. Here, the bicycle freewheel 12' is identical to the bicycle freewheel 12, except that each of the pawl members 40 have been replaced with a pawl member 40'. The pawl members 40' are identical to the pawl members 40 except that the pawl members 40' do not include a contact member such as discussed above. In the same manner as the first embodiment, the pawl members 40' are biased radially outward by the force applying member 44, which is disposed in the grooves 40c' of the pawl members 40'. Thus, for this first modification, only the pawl members 40' and their cooperation with the ratchet-tooth members 42 will be discussed and/or illustrated herein. The parts of the first modification that are identical to the parts of the first embodiment will be given the same reference numerals as the parts of the first embodiment.

In the bicycle freewheel 12' of this first modification, the noise caused during freewheeling can be reduced as compared to a conventional bicycle freewheel. In particular, in a conventional bicycle freewheel, there are two types of noises that occur during freewheeling. The first type of noise is a sharp metallic knocking noise that is caused by the tips of the pawl members hitting the ratchet-tooth members due to the release of the highly loaded pawl spring, which forces the pawl members into contact with the ratchet-tooth members as the pawl members move from one tooth to the next tooth during freewheeling. The second type of noise is a muted sliding noise that occurs after the first noise. At this stage where the second type of noise occurs, the pawl spring is in the process of being loaded by the shape of the ratchet-tooth members during freewheeling.

In contrast with a conventional bicycle freewheel, the bicycle freewheel 12' eliminates the first type of noise by providing the depressions 47 (the second depressions) within the first depressions D. As seen in FIGS. 13 to 15, each of the depressions 47 (the second depressions) are configured relative to the first depressions D to prevent a tip (the distal end 40a') of the pawl members 40' from initially contacting the ratchet-tooth members 42 immediately upon the pawl members 40 moving into the first depressions D of the ratchet-tooth members 42 while freewheeling. In other words, with the depressions 47, the pawl members 40' will not hit directly onto the ratchet-tooth members 42 during a sudden release of the tension in the force applying member 44 (the pawl spring) during freewheeling. As seen in FIG. 14, with the force applying member 44 fully released, the tip (the distal end 40a') of the pawl members 40' does not contact the ratchet-tooth members 42. However, the muted sliding noise of the second type of noise would then occur as the freewheeling surfaces 40e' of the pawl members 40' slide along the freewheeling surfaces 48. Thus, this arrangement eliminates the sharp metallic knocking noise of the first type of noise as the pawl members 40' are keep from initially contacting the freewheeling surfaces 48 of the ratchet-tooth members 42.

Referring now to FIGS. 16 to 17, a second modification of the first embodiment will now be explained. Here, each of the contact members 38 and each of the pawl members 40 have been replaced with a contact members 38" and a pawl member 40" as discussed below. The pawl members 40" are identical to the pawl members 40 except that the pawl members 40" have been modified to attach the contact members 38". Thus, for this second modification, only the contact members 38" and the pawl members 40" will be discussed and/or illustrated herein.

Here, each of the pawl members 40" has a distal end 40a" and a proximal end 40b". Each of the pawl members 40" further has a groove 40c" that extends from the distal end 40a" to the proximal end 40b" for receiving the force applying member 44 (the pawl spring) in the same manner as the pawl members 40. Each of the pawl members 40" further has a contact member mounting portion 40d" formed on the distal end 40a". Each of the pawl members 40" has a freewheeling surface 40e" that contacts the freewheeling surfaces 48 of the ratchet-tooth members 42 during freewheeling. The contact member mounting portion 40d" is a pin that has an annular recess 40r. Each of the contact members 38" is a roller member that includes a damping member 50" and a bearing sleeve 52". The damping member 50" and the bearing sleeve 52" are rotatably mounted as a unit on one of the contact member mounting portion 40d" (a pin). In particular, the damping member 50" has a non-circular opening 50a" which non-rotatably mates with three legs 52a" of the bearing sleeve 52". Preferably, the non-circular opening 50a" and the three legs 52a" are configured to form a snap-fit connection therebetween. Specifically, outer projections that extend radially outward on the free ends of the three legs 52a" engage an axial face of the damping member 50" via a snap-fit as the damping member 50" is pushed axially onto the bearing sleeve 52". Likewise, the three legs 52a" of the bearing sleeve 52" and the contact member mounting portion 40d" are configured to forma snap-fit connection therebetween. Specifically, inner projections on the free ends of the three legs 52a" extend radially inward and engage the annular recess 40f of the contact member mounting portion 40d" via a snap-fit as the bearing sleeve 52" is pushed axially onto the contact member mounting portion 40d".

Figure 19:
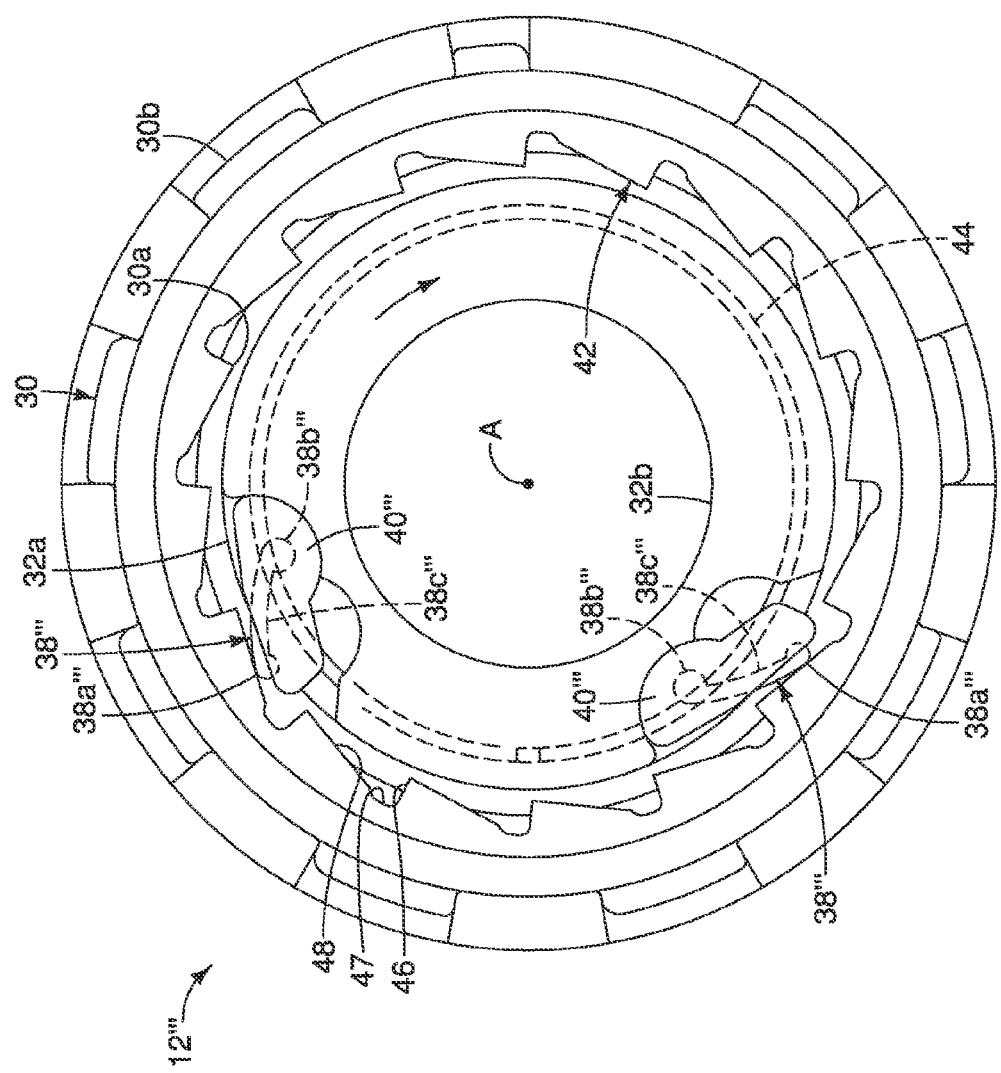
FIG. 19 is an axial elevational view, similar to FIG. 4, of an alternate bicycle freewheel as seen from the outer end with selected parts removed for the purposes of illustration to shown a pawl-type one-way clutch in which pawl members are provided with a resilient spring members as contact members that engage the ratchet-tooth member for providing a quieter freewheel while freewheeling.
Figure 20:
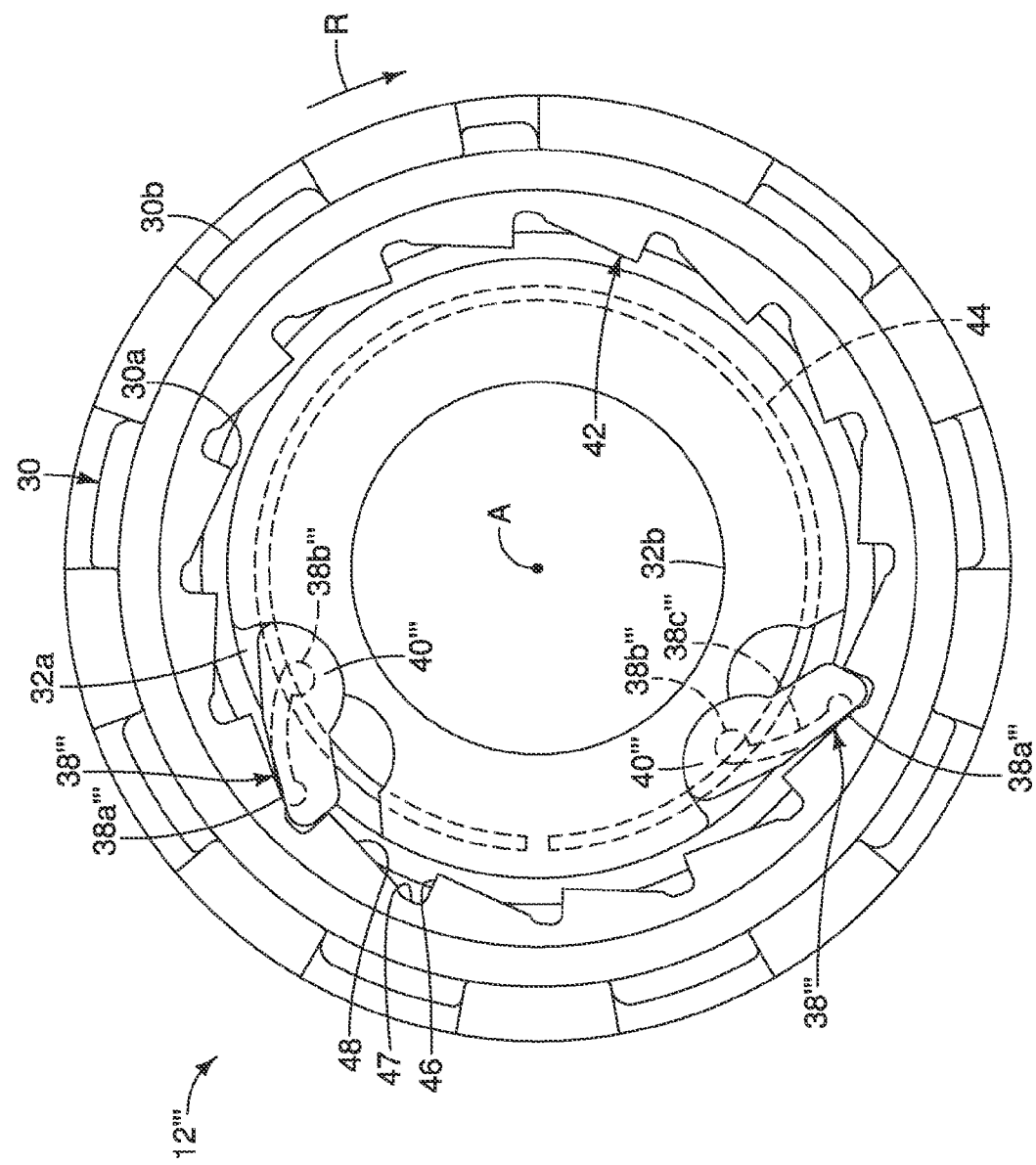
FIG. 20 is an axial devotional view of the alternate bicycle freewheel illustrated in FIG. 19 with the pawls fully engaged with the ratchet-tooth member during rotation of the driving member in a driving rotational direction.

Referring now to FIGS. 19 and 20, a bicycle freewheel 12'" in accordance with a third modification of the first embodiment will now be explained. Here, the bicycle freewheel 12'" is identical to the bicycle freewheel 12, except that each of the contact members 38 and each of the pawl members 40 have been replaced with a contact members 38'" and a pawl member 40'" as discussed below. The pawl members 40'" are identical to the pawl members 40, except that the pawl members 40'" have been modified to attach the contact members 38'" thereto. Thus, for this third modification, only the contact members 38'" and the pawl members 40'" will be discussed and/or illustrated herein.

Here, the contact members 38'" are plastic spring members that are resilient. Each of the contact members 38'" has a freewheeling surface 38a'" that contacts the freewheeling surfaces 48 during freewheeling to prevent the pawl members 40'" from initially contacting the freewheeling surfaces 48 as the pawl members 40'" move from one of the freewheeling surfaces 48 to the next one of the freewheeling surfaces 48 during freewheeling. The freewheeling surfaces 38a''' are curved surfaces so that the contact members 38''' can deform during non-freewheeling (driving) so that jamming is avoided.

In this third modification of the first embodiment, the contact members 38''' are cantilevered arm members that each has a fixed end 38b''' that is fixedly attached to its respective one of the pawl members 40'''. Thus, during freewheeling and non-freewheeling (driving), the fixed end 38b''' of the contact members 38''' does not move relative to the pawl members 40''' to which it is attached. Rather, an arm portion 38c''' of each of the contact members 38''' will elastically deform. In particular, during freewheeling, as the freewheeling surfaces 38a''' of the pawl members 40''' move from one of the freewheeling surfaces 48 to the next one of the freewheeling surfaces 48, the arm portion 38c''' of each of the contact members 38''' will flex so as to act as a shock absorber to reduce noise. Once loading of the contact members 38''' is stopped, the contact members 38''' will spring back to its original unloaded state. During non-freewheeling (driving), the arm portion 38c''' of each of the contact members 38''' will deform so that the pawl members 40''' can firmly engage the ratchet-tooth members 42. In other words, during non-freewheeling (driving), the arm portion 38c''' of each of the contact members 38''' will deform so that the freewheeling surfaces 38a''' of the pawl members 40''' can retract to permit full engagement of the pawl members 40''' with the ratchet-tooth members 42.

Figure 21:
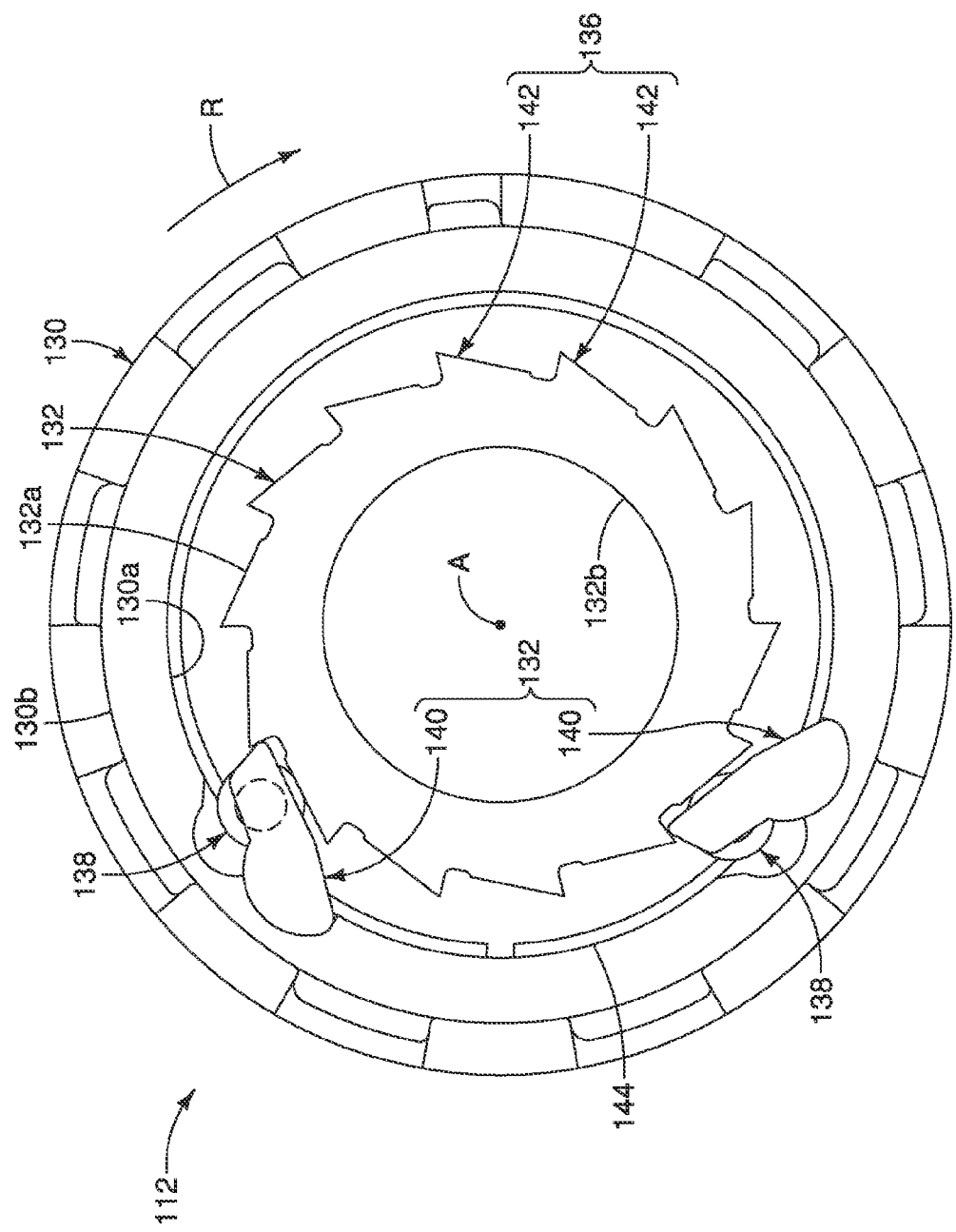
FIG. 21 is an axial elevational view, similar to FIG. 4, of an alternate bicycle freewheel as seen from the outer end with selected parts removed for the purposes of illustration to shown a pawl-type one-way clutch in which a driving member includes at least one pawl member that is movably mounted on an inner circumferential portion of the driving member to engage a ratchet-tooth member disposed on an outer circumferential portion of the driven member.

Referring now to FIG. 21, a bicycle freewheel 112 in accordance with a second embodiment will now be explained. The bicycle freewheel 112 is used with the bicycle hub 10. The only significant difference between the bicycle freewheels 12 and 112 is that the reversal of the parts of the pawl-type one-way clutch. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Here, in the second embodiment, the bicycle freewheel 112 basically includes a driving member 130 and a driven member 132. The driven member 132 has a first engaging member 134, while the driving member 130 has a second engaging member 136. The bicycle freewheel 112 has a contact member 138 similar to the first embodiment. The first engaging member 134 preferably includes two pawl members 140 that are mounted on an inner circumferential portion 130a of the driving member 130. The second engaging member 136 preferably includes a plurality of ratchet-tooth members 142 that are formed on an outer circumferential portion 132a of the driven member 132. The driving member 130 has an outer circumferential portion 130b with a plurality of splines for non-rotatably engaging the bicycle sprockets S in a conventional manner. The driven member 132 has an inner circumferential portion 132b that is configured to be non-rotatably attached to the hub body 16 in a conventional manner.

The operation of the bicycle freewheel 112 is similar to the operation of the first embodiment, discussed above. Thus, the bicycle freewheel 112 will not be discussed and/or illustrated in further detail.

Figure 22:
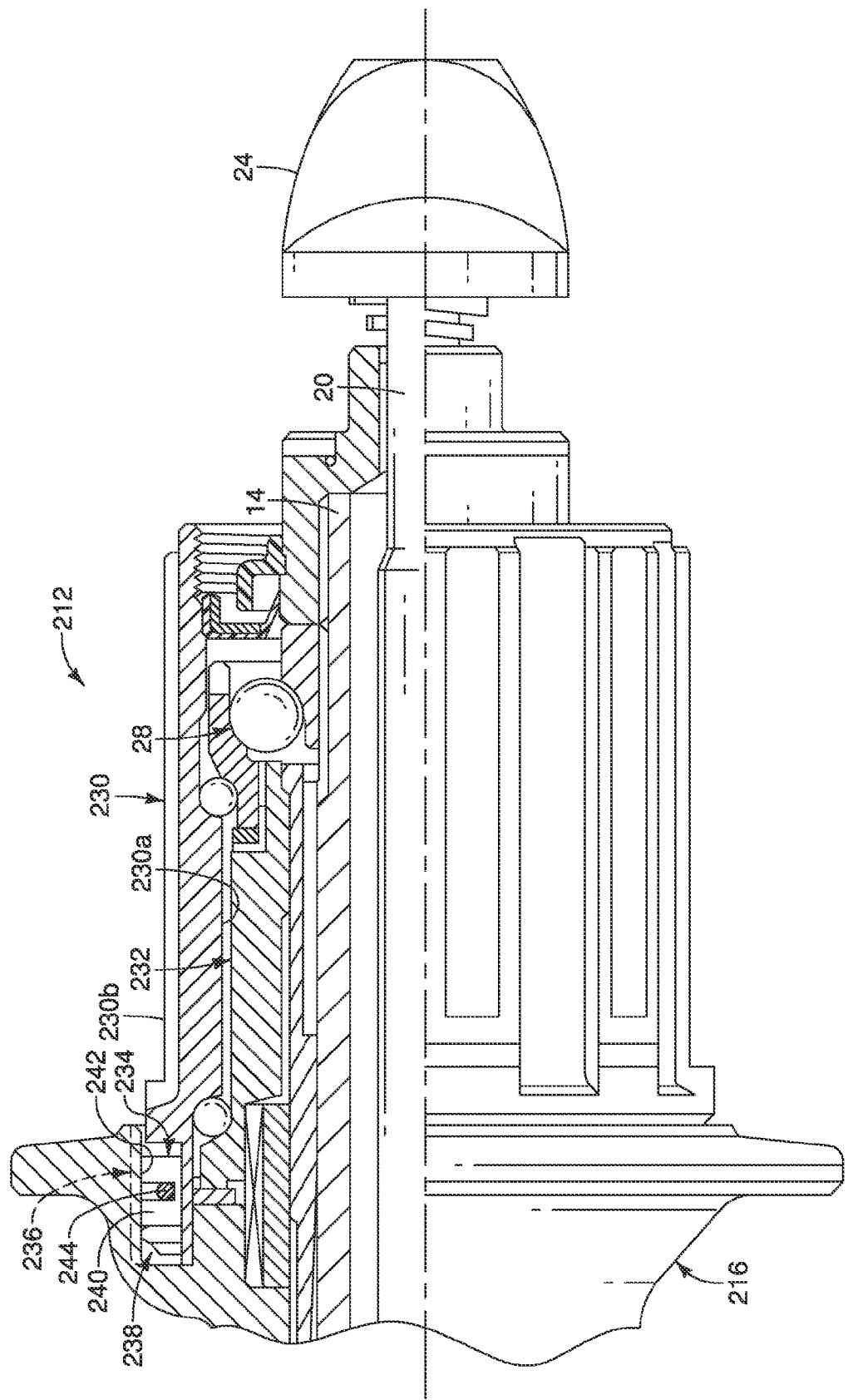
FIG. 22 is an enlarged half cross sectional view of an alternate bicycle freewheel in which a pawl-type one-way clutch in which a driving member includes at least one pawl member that is movably mounted on an outer circumferential portion of the driving member to engage a ratchet-tooth member disposed on an inner circumferential portion of the driven member.

Referring now to FIG. 22, a bicycle freewheel 212 in accordance with a third embodiment will now be explained. The only significant difference between the bicycle freewheels 12 and 212 is that the location of the pawl-type one-way clutch. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

Here, in the third embodiment, a modified hub body 216 is used with the bicycle freewheel 212. The bicycle freewheel 212 basically includes a driving member 230 and a driven member 232. The driven member 232 is fixed to the hub body 216. Thus, the hub body 216 can be considered to be a part of the driven member 232. The driven member 232 has a first engaging member 234, while the driving member 230 has a second engaging member 236. The bicycle freewheel 212, has a contact member 238 similar to the first embodiment.

In the third illustrated embodiment, the driving member 230 has a first portion, while the hub body 216 of the driven member 232 has a second portion that is oppositely arranged to the first portion of the driving member 230. In the third illustrated embodiment, the first portion is defined by an outer circumferential portion 230a of the driving member 230, and the second portion is defined by an inner circumferential portion 232a of the hub body 216 of the driven member 232. The second portion (i.e., the inner circumferential portion 232a) of the hub body 216 of the driven member 232 is arranged around the first portion (i.e., outer circumferential portion 230a) of the driving member 230. The at least one first engaging member 234 is disposed on one of the first portion of the driving member 230 and the second portion of the driven member 232, while the at least one second engaging member 236 is disposed on the other of the first portion of the driving member 230 and the second portion of the driven member 232. Thus, in the second illustrated embodiment, the first portion of the driving member 230 includes at least one pawl member 240 movably mounted thereon, and the second portion of the driven member 232 includes the at least one ratchet-tooth member 242.

The first engaging member 234 preferably includes two of the pawl members 240 (only one shown) that are mounted on the outer circumferential portion 230a of the driving member 230. The second engaging member 236 preferably includes a plurality of the ratchet-tooth members 242 that are formed on an inner circumferential portion 232a of the hub body 216 that formed a part of the driven member 232 in this embodiment. The driving member 230 has an outer circumferential portion 230b with a plurality of splines for non-rotatably engaging the bicycle sprockets S in a conventional manner. The driven member 232 has an inner circumferential portion 232b that is configured to be non-rotatably attached to the hub body 16 in a conventional manner.

The operation of the bicycle freewheel 212, is similar to the operation of the first embodiment, discussed above. Thus, the bicycle freewheel 212 will not be discussed and/or illustrated in further detail.

Referring now to FIG. 23, a bicycle freewheel 312 in accordance with a fourth embodiment will now be explained. Here, in the fourth embodiment, the bicycle freewheel 212 is used with the bicycle hub 10, which is discussed above. The bicycle freewheel 212 basically includes a driving member 330 and a driven member 332. The driven member 332 is fixed to the hub body 16. The driven member 332 has a first engaging member 334, while the driving member 330 has a second engaging member 336. The bicycle freewheel 312 has a plurality of contact members 338 mounted to the second engaging member 336.

Similar to the first embodiment, the first engaging member 334 includes two pawl members 340, and the second engaging member 336 includes a plurality of ratchet-tooth members 342. The bicycle freewheel 312 further includes a force applying (biasing) member 344 that biases the pawl members 340 towards engagement with the ratchet-tooth members 342. Each of the ratchet-tooth members 342 includes one of the contact members 338. Preferably, the contact members 338 are elastomer damping members.

Thus, the only significant difference between the bicycle freewheels 12 and 312 is that the contact members. In view of the similarity between the first and third embodiments, the descriptions of the parts of the third embodiment that are identical to the parts of the first embodiment may be omitted for the sake of brevity.

Referring now to FIGS. 24 to 26, another modification to the contact members and the pawl members will now be explained. Here, a contact member 438 is provided on a pawl member 440. The contact member 438 and the pawl member 440 can be used in place of each of the contact members and each of the pawl members, respectively. Basically, the pawl member 440 is identical to the pawl members 40, except that the pawl member 440 has been modified for attaching the contact member 438 thereto. Thus, only the contact member 438 and the pawl member 440 will be discussed and/or illustrated herein.

Here, the pawl member 440 has a distal end 440a and a proximal end 440b. The pawl member 440 further has a groove 440c that extends from the distal end 440a to the proximal end 440b for receiving the force applying member 44 (the pawl spring) in the same manner as the pawl members 40. The pawl member 440 further has a contact member mounting portion or pin 440d formed on the distal end 440a. The pawl member 440 has a freewheeling surface 440e that contacts the freewheeling surfaces 48 of the ratchet-tooth members 42 during freewheeling. The contact member 438 is a roller member that includes a damping member 450 and a bearing sleeve 452. The damping member 150 and the bearing sleeve 452 are rotatably mounted as a unit on the contact member mounting pin 440d. In particular, the damping member 450 has a non-circular opening 450a which non-rotatably mates with two legs 452a of the bearing sleeve 452.

The contact member 438 further includes an attachment member 454 that holds the damping member 450 and the bearing sleeve 452 on the contact member mounting portion 440d. Specifically, the pawl member 440 further includes an attachment portion or pin 440f that projects from one of the sides of the pawl member 440. The attachment pin 440f and the contact member mounting pin 440d have parallel or substantially parallel longitudinal axes. The attachment member 454 is secured to the attachment pin 440f by a press fit also known as an interference fit or friction fit in which fastening between two parts (i.e., the attachment pin 440f and the attachment member 454) is achieved solely by friction and a small amount of elastic deformation after the parts are pushed together, rather than by any other means of fastening.

Here, the attachment member 454 is provided with a base portion 454a and a pair of flanges 454b that defines a space 454c for receiving the damping member 450 and the bearing sleeve 452 therein. The base portion 454a has a bore 454d that is dimensioned such that the attachment pin 440f is press fitted into the bore 454d to secure the attachment member 454 to the pawl member 440. The flanges 454b has openings 454e and 454f that are sized to receive the contact member mounting pin 440d. Since the contact member mounting pin 440d is a stepped pin, the openings 454e and 454f are different sizes to match the shape of the contact member mounting pin 440d.

Figure 28:
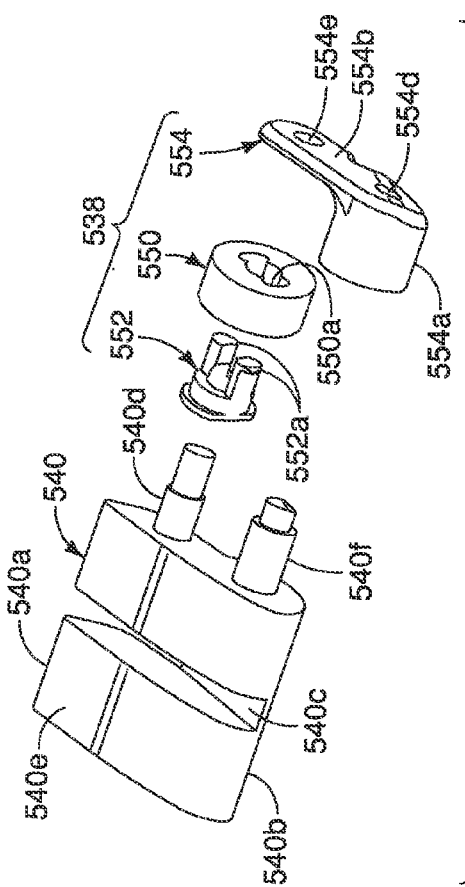
FIG. 28 is an exploded perspective view of the pawl member illustrated in FIG. 27 with the alternate contact member and the alternate mounting arrangement.
Figure 27:
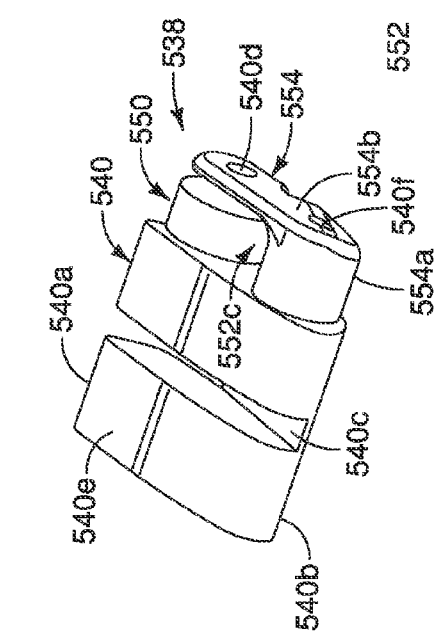
FIG. 27 is a perspective view of a pawl member with an alternate contact member and an alternate mounting arrangement.
Figure 29:
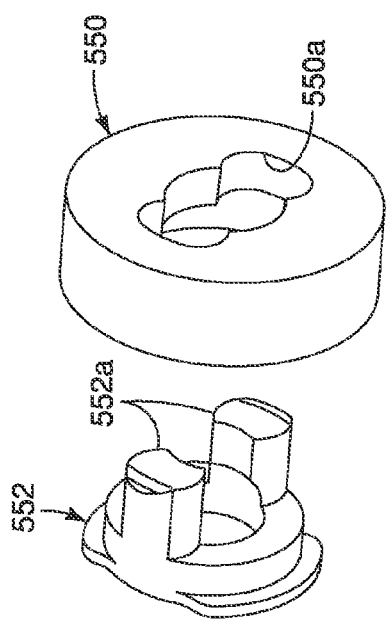
FIG. 29 is an exploded perspective view of the alternate contact member illustrated in FIGS. 27 and 28.

Referring now to FIGS. 27 to 29, another modification to the contact members and the pawl members will now be explained. Here, a contact member 538 is provided on a pawl member 540. The contact member 538 and the pawl member 540 can be used in place of each of the contact members and each of the pawl members, respectively. Basically, the pawl member 540 is identical to the pawl members 40, except that the pawl member 540 has been modified for attaching the contact member 538 thereto. Thus, only the contact member 538 and the pawl member 540 will be discussed and/or illustrated herein.

Here, the pawl member 540 has a distal end 540a and a proximal end 540b. The pawl member 540 further has a groove 540c that extends from the distal end 540a to the proximal end 540b for receiving the force applying member 44 (the pawl spring) in the same manner as the pawl members 40. The pawl member 540 further has a contact member mounting portion or pin 540d formed on the distal end 540a. The pawl member 540 has a freewheeling surface 540e that contacts the freewheeling surfaces 48 of the ratchet-tooth members 42 during freewheeling. The contact member 538 is a roller member that includes a damping member 550 and a bearing sleeve 552. The damping member 550 and the bearing sleeve 552 are rotatably mounted as a unit on the contact member mounting pin 540d. In particular, the damping member 550 has a non-circular opening 550a which non-rotatably mates with two legs 552a of the bearing sleeve 552. Preferably, the non-circular opening 550a and the two legs 552a are configured to form a snap-fit connection therebetween. Specifically, outer projections that extend radially outward on the free ends of the legs 552a engage an axial face of the damping member 550 via a snap-fit as the damping member 550 is pushed axially onto the bearing sleeve 552.

The contact member 538 further includes an attachment member 554 that holds the damping member 550 and the bearing sleeve 552 on the contact member mounting portion 540d. Specifically, the pawl member 540 further includes an attachment portion or pin 540f that projects from one of the sides of the pawl member 540. The attachment pin 540f and the contact member mounting pin 540d have parallel or substantially parallel longitudinal axes. The attachment member 554 is secured to the attachment pin 540f by a press fit also known as an interference fit or friction fit in which fastening between two parts (i.e., the attachment pin 540f and the attachment member 554) is achieved solely by friction and a small amount of elastic deformation after the parts are pushed together, rather than by any other means of fastening.

Here, the attachment member 554 is provided with a base portion 554a and a single flange 554b. After the attachment member 554 is attached to the pawl number 540, a space 554c is formed between the pawl member 540 and the flange 554b for receiving the damping member 550 and the bearing sleeve 552 therein. The base portion 554a has a bore 554d that is dimensioned such that the attachment pin 540f is press fitted into the bore 554d to secure the attachment member 554 to the pawl member 540. The flange 554b has an opening 554e that is sized to receive the contact member mounting pin 540d.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, in the above embodiments, the contact members can be mounted on the ratchet-tooth members. In any case, the freewheeling surfaces of the contact members are offset from the freewheeling surfaces of the pawl members and the ratchet-tooth members 42, which include one of the contact members, in a direction toward the freewheeling surface of the other of the pawl members and the ratchet-tooth members. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle freewheel comprising:
a driving member configured to be coupled to a bicycle sprocket, the driving member having a first portion;
a driven member configured to be coupled to a bicycle hub, the driven member having a second portion that is oppositely arranged to the first portion of the driving member;
a plurality of first engaging members disposed on one of the first portion of the driving member and the second portion of the driven member;
a plurality of second engaging members disposed on the other of the first portion of the driving member and the second portion of the driven member, each of the second engaging member configured to engage one of the first engaging members while non-freewheeling;
a plurality of contact members each mounted on a surface of each of one of the first engaging members and the second engaging members, each of the contact members including a first freewheeling surface contacting a second freewheeling surface of the other of the first engaging members and the second engaging members while freewheeling, and each of the one of the first engaging members and the second engaging members including a third freewheeling surface that contacts the second freewheeling surface while freewheeling; and
a plurality of separate damping members, each of the contact members including one of the plurality of separate damping members, and each of the plurality of separate damping members defining the first freewheeling surface of each of the contact members,
the first freewheeling surface contacting the second freewheeling surface prior to the third freewheeling surface contacting the second freewheeling surface during freewheeling.

2. The bicycle freewheel according to claim 1, wherein the driving member and the driven member are rotatably arranged about a rotational axis.

3. The bicycle freewheel according to claim 2, wherein at least one first engaging member engages at least one second engaging member while the driving member and the driven member rotate together in a driving rotational direction.

4. The bicycle freewheel according to claim 1, wherein each of the driving member and the driven member has a tubular shape.

5. The bicycle freewheel according to claim 4, wherein the first portion is defined by an outer circumferential portion of the driving member; and
the second portion is defined by an inner circumferential portion of the driven member, the second portion being arranged around the first portion of the driving member.

6. The bicycle freewheel according to claim 4, wherein the second portion is defined by an outer circumferential portion of the driven member; and
the first portion is defined by an inner circumferential portion of the driving member arranged around the second portion of the driven member.

7. The bicycle freewheel according to claim 1, wherein each of the plurality of separate damping members is an elastomer member.

8. A bicycle freewheel comprising:
a driving member configured to be coupled to a bicycle sprocket, the driving member having a first portion;
a driven member configured to be coupled to a bicycle hub, the driven member having a second portion that is oppositely arranged to the first portion of the driving member;
at least one first engaging member disposed on one of the first portion of the driving member and the second portion of the driven member;
at least one second engaging member disposed on the other of the first portion of the driving member and the second portion of the driven member, the at least one second engaging member engaging the at least one first engaging member while non-freewheeling; and at least one contact member disposed on one of the at least one first engaging member and the at least one second engaging member, the at least one contact member contacting the other of the at least one first engaging member and the at least one second engaging member while freewheeling, the at least one contact member including a damping member that defines a freewheeling surface of the at least one contact member, the freewheeling surface of the at least one contact member contacting the other of the at least one first engaging member and the at least one second engaging member while freewheeling, and the at least one contact member is rotatably mounted on the one of the at least one first engaging member and the at least one second engaging member.

9. The bicycle freewheel according to claim 8, wherein the at least one contact member is a roller member.

10. The bicycle freewheel according to claim 9, wherein the damping member is an elastomer member.

11. A bicycle freewheel comprising:
a driving member configured to be coupled to a bicycle sprocket, the driving member having a first portion;
a driven member configured to be coupled to a bicycle hub, the driven member having a second portion that is oppositely arranged to the first portion of the driving member;
a plurality of first engaging members disposed on one of the first portion of the driving member and the second portion of the driven member;
a plurality of second engaging members disposed on the other of the first portion of the driving member and the second portion of the driven member, each of the second engaging member configured to engage one of the first engaging members while non-freewheeling; and
a plurality of contact members, each of the contact members being mounted on each of one of the first engaging members and the second engaging members, each of the contact members including a first freewheeling surface contacting a second freewheeling surface of the other of the first engaging members and the second engaging members while freewheeling, and each of the one of the first engaging members and the second engaging members including a third freewheeling surface that contacts the second freewheeling surface while freewheeling,
each of the contact members including a radially movable damping member that defines the first freewheeling surface of each of the respective contact members,
each of the first engaging members including at least one pawl member,
each of the second engaging members including at least one ratchet-tooth member, and
the first freewheeling surface contacting the second freewheeling surface prior to the third freewheeling surface contacting the second freewheeling surface during freewheeling.

12. The bicycle freewheel according to claim 11, wherein
the first portion of the driving member includes the pawl members movably mounted thereon; and
the second portion of the driven member includes ratchet-tooth members.

13. The bicycle freewheel according to claim 11, wherein the second portion of the driven member includes the pawl members movably mounted thereon; and the first portion of the driving member includes the ratchet-tooth members.

14. The bicycle freewheel according to claim 11, wherein each of the pawl members has a distal end and a proximal end;
the distal end of each of the pawl members is configured to engage with the ratchet-tooth members; and
the proximal end of each of the pawl members is pivotally mounted on the one of the first portion of the driving member and the second portion of the driven member.

15. The bicycle freewheel according to claim 11, wherein each of the contact members is disposed on one of the pawl members and the ratchet-tooth members; and
the first freewheeling surface of each of the contact members is offset from the third freewheeling surface in a direction toward the second freewheeling surface.

16. A bicycle freewheel comprising:
a driving member configured to be coupled to a bicycle sprocket, the driving member having a first portion;
a driven member configured to be coupled to a bicycle hub, the driven member having a second portion that is oppositely arranged to the first portion of the driving member;
at least one first engaging member disposed on one of the first portion of the driving member and the second portion of the driven member, the at least one first engaging member including at least one pawl member, the at least one pawl member having a distal end and a proximal end;
at least one second engaging member disposed on the other of the first portion of the driving member and the second portion of the driven member, the at least one second engaging member including at least one ratchet-tooth member, and the at least one second engaging member engaging the at least one first engaging member while non-freewheeling; and
at least one contact member mounted on one of the at least one first engaging member and the at least one second engaging member, the at least one contact member including a first freewheeling surface contacting a second freewheeling surface of the other of the at least one first engaging member and the at least one second engaging member while freewheeling, each of the at least one first engaging member and the at least one second engaging member including a third freewheeling surface that contacts the second freewheeling surface while freewheeling, the at least one contact member including a damping member that defines the first freewheeling surface of the at least one contact member, the at least one contact member being disposed between the distal end and the proximal end of the at least one pawl member in a radial direction, and
the first freewheeling surface contacting the second freewheeling surface prior to the third freewheeling surface contacting the second freewheeling surface during freewheeling.

17. A bicycle freewheel comprising:
a driving member configured to be coupled to a bicycle sprocket, the driving member having a first portion;
a driven member configured to be coupled to a bicycle hub, the driven member having a second portion that is oppositely arranged to the first portion of the driving member;
at least one pawl member disposed on one of the first portion of the driving member and the second portion of the driven member, the at least one pawl member including a first freewheeling surface contacting the other of the first portion of the driving member and the second portion of the driven member while freewheeling;

at least one contact member mounted on the at least one pawl member, the at least one contact member including a damping member that defines a second freewheeling surface of the at least one contact member; and at least one ratchet-tooth member disposed on the other of the first portion of the driving member and the second portion of the driven member, the at least one ratchet-tooth member engaging the at least one pawl member while non-freewheeling, the at least one ratchet-tooth member having a third freewheeling surface that contacts the second freewheeling surface of the at least one contact member while freewheeling, the at least one ratchet-tooth member including a first depression and a second depression formed in the first depression, and the second freewheeling surface contacting the third freewheeling surface prior to the first freewheeling surface contacting the third freewheeling surface during freewheeling.

18. The bicycle freewheel according to claim 17, wherein the second depression is configured relative to the first depression to prevent a tip of the at least one pawl member from initially contacting the at least one ratchet-tooth member immediately upon the at least one pawl member moving into the first depression of the at least one ratchet-tooth member while freewheeling.

19. The bicycle freewheel according to claim 17, wherein the damping member is made of an elastic material.

* * * * *